(12) United States Patent
Lackey

(10) Patent No.: US 8,023,921 B2
(45) Date of Patent: Sep. 20, 2011

(54) QUADRATIC AMPLITUDE CONTROL CIRCUIT FOR COSITE INTERFERENCE CANCELLATION

(75) Inventor: Raymond J. Lackey, Bohemia, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 453 days.

(21) Appl. No.: 12/315,431

(22) Filed: Dec. 3, 2008

(65) Prior Publication Data
US 2010/0136941 A1  Jun. 3, 2010

(51) Int. Cl.
*H04B 1/06* (2006.01)
(52) U.S. Cl. .................. 455/307; 455/340; 455/296
(58) Field of Classification Search ............... 455/63.1, 455/307
See application file for complete search history.

(56) References Cited

U.S. PATENT DOCUMENTS

| 6,693,971 | B1 | 2/2004 | Kowalski |
| 7,310,507 | B2 * | 12/2007 | Mizumasa et al. ............ 455/307 |
| 7,515,895 | B2 * | 4/2009 | Vorenkamp et al. .......... 455/307 |
| 7,672,657 | B2 * | 3/2010 | Cowley et al. ................ 455/307 |

* cited by examiner

*Primary Examiner* — Hai L Nguyen
(74) *Attorney, Agent, or Firm* — Dilworth & Barrese, LLP; Leo G. Lenna; Daniel J. Long

(57) ABSTRACT

A quadratic amplitude matching system and associated method with an associated tuning control system is provided for continuously and automatically tuning a quadratic amplitude matching filter (QAMF) to a band center of an interfering signal to provide improved rejection of an interfering signal coupled from a transmission antenna into a local receive antenna in the presence of local multi-path, thereby providing improved interference cancellation system performance. The matching control system is provided as an element of an interference cancellation system.

16 Claims, 15 Drawing Sheets

QUADRATIC AMPLITUDE CONTROL CIRCUIT FOR COSITE INTERFERENCE CANCELLATION

FIELD OF THE INVENTION

The invention relates to the field of radio communication and, in particular, to the reduction of interference in signals coupled from a transmission antenna into a local receive antenna in the presence of a local multipath.

Description of the Related Art

Unwanted (i.e., interfering) signals manifest themselves in several ways. Interference can cause a reduction in the sensitivity of a receiver (receiver desensitization), masking of a desired signal, tracking of an undesired interfering signal and loss of the desired signal, and processing of the unwanted interfering signal instead of the desired signal. Each of these manifestations of interference limits the communication capabilities of the radio system afflicted by this problem. The effects of interference can be some combination of the absence of usable output from a receiver, false signals from a receiver, and malfunction of a device which is operated by the receiver. During emergency situations, the loss and corruption of the desired signal can be critical.

Unwanted signal interference is generally caused by modulation of signals provided to the receiver by the carrier waves, or by the wideband noise, generated by collocated transmitters. Unwanted signal interference also occurs when frequency-hopping transmitters are transmitting signals at frequencies that are substantially close to the frequency of the desired receiver signal (i.e., co-channel operation). Unwanted signal interference can also be caused by "pseudo white-noise" generated by transmitters over a wide band of frequencies on either side of the transmitter's operating frequency. It is often found in collocated transceiver systems that this "pseudo white-noise" reaches unacceptable levels within the operating band of adjacent receivers. Unwanted signal interference is also attributed to signals (i.e., spurious emissions) generated by transmitters at odd harmonics of the fundamental frequency of the transmitter output signal. This is caused by the non-linear transfer characteristics of amplifiers in the transmitter chain, or by passive inter-modulation at the transmitter or receiver antenna connectors.

In order to substantially reduce and eliminate the undesired interfering signals while maintaining the spatial benefits afforded by proximately locating transceivers, especially frequency-hopping transceivers, several signal processing techniques have been proposed. These techniques include agile filtering, agile filtering with multicoupling and interference cancellation.

When the signal noise and spurious sidebands generated by the interfering transmitter are strong, broadband, and scenario dependant, standard interference cancellation is inadequate. Changes in the scenario surrounding the platform may vary the coupling between the transmitter and the protected receiver and thus require adjustment of system parameters in an adaptive process.

Interference cancellation involves sampling the transmitter output signal in order to eliminate from the received signal, any interfering signal having a frequency proximate to the receiver carrier frequency. In co-site environments, a collocated source usually interferes with the receiver due to the finite isolation between transmit and receive antennas. This interference in a co-site environment is a combination of several factors, desensitization caused by one or more nearby high-power transmitter carriers and wideband moderate to low-power interference components associated with those carriers. These interference components are received by the collocated radio and degrade system operation. The nearby high-power transmitter carrier signals could simply exist as a part of the platform signal environment. Further, the interfering signals may be classified as either cosite or remote interferers. A cosite interferer is physically collocated with the receiver on a platform permitting a physical circuit connection from the interference generator to the receiver. A remote interferer is located far enough from the receiver to preclude a physical circuit connection.

A typical Interference cancellation system utilizes a correlation-based adaptive controller using feedback derived after the cancellation process. The system takes a sample of an interference signal and adjusts the magnitude and phase such that the result is equal in amplitude and 180° out of phase with the interference signal at the input of the receiver. The vector sum of the two signals will cancel, leaving only the signal of interest. In practice, however, the two signals are not identical, due to unwanted distortion in the reference path, as well as differences in signal path lengths and non-ideal components in the Tx/Rx signal paths. Cancellation performance is a function of amplitude and phase match between the interference signal and the sampled signal. Transmission path distortions include time delay, magnitude amplitude and phase distortion, linear amplitude and phase distortion, and quadratic distortion, correction of each adding a level of performance enhancement but also adding to system complexity and difficulty in implementing the corrections.

To suppress a wideband interference signal, the performance of a cancellation system is directly proportional to the match between the sampled transmission cancellation signal and the receive path interference signal across the signal bandwidth. The interference cancellation system (ICS) compensates for minor corrections and component drift by controlling a complex weight that implements flat phase and amplitude controls in the adaptive control loop (ACL) to correct the magnitude amplitude and phase errors between the two. The receive path interference signal provided to the ICS is disrupted by signal distortions in time of arrival, linear and non-linear (i.e., quadratic) amplitude, and linear and non-linear phase. The sampled transmission cancellation signal must be adjusted to match this distorted receive path signal as closely as possible to achieve complete nulling of the received interference signal. The present disclosure addresses these concerns by focusing on minimizing mismatch errors caused by first order non-linear amplitude distortions.

As is well known, cosite interference cancellation requires amplitude slope matching across the signal bandwidth to achieve a deep null across the band. U.S. Pat. No. 6,693,971 "Wideband co-site interference reduction apparatus" (Kowalski) issued on Feb. 17, 2004 and assigned to BAE Systems Information and Electronic Systems Integration Inc. (Greenlawn, N.Y.), incorporated by reference herein in its entirety, discloses a method of implementing a near-linear correction of the amplitude slope using an amplitude slope-matching filter. However, a drawback of the system and method of Kowalski is that it also imparts a quadratic shape to the amplitude across the band.

Similarly, the propagation path can also impart a quadratic amplitude modulation across the band that will be time varying with the changing environment. Together, these two distortions limit the nulling performance of the cosite interference cancellation system.

A need therefore exists for a system and method for continuously adjusting the quadratic amplitude of a coupled cosited transmitter signal before subtracting it from the propagated and received signal with multipath dispersive distortions to achieve required nulling. Such a system would also have to be tuned with the transmitter frequency and adjust to changes in the propagation path distortion.

SUMMARY OF THE INVENTION

It is therefore an object of the present disclosure to provide a method and apparatus for reducing the effects of interference between collocated transceivers.

It is an object of the present disclosure to provide a method and apparatus in which proximately located transceivers can simultaneously transmit and receive independent signals without substantially affecting the quality of a desired signal reception.

It is another object of the present disclosure to eliminate the effects of interference between collocated transceivers utilizing interference cancellation.

It is a more particular object of the present disclosure to provide a method and apparatus for providing a quadratic amplitude matching capability to an interference cancellation system by implementing a quadratic amplitude matching filter (QAMF).

It is a more particular object of the present disclosure to provide a method and apparatus for automatically tuning a bank of lobed filters of the QAMF such that the signal tracked is near the center of each lobing structure to generate quadratic shaping structures in the region of a tracked signal spectrum.

It is yet another object of the present disclosure to provide a method and apparatus for tuning this quadratic amplitude matching filter (QAMF) over as large of a band as possible without external interface or control.

The present disclosure provides a quadratic amplitude matching filter (QAMF) architecture and a tuning control system as an element of an interference cancellation system and associated method for continuously and automatically tuning a quadratic amplitude matching filter (QAMF) to a band center of an inserted coupled transmitted signal for improved interference cancellation system performance and adjusting to match propagation path distortion. More particularly, the QAMF system provides improved rejection of an interfering signal coupled from a transmission antenna into a local receive antenna in the presence of local multipath.

The tuning control system and associated method of the present disclosure provide improved signal rejection over other possible tuning approaches by continuously tuning (adjusting) a lobed filter of the tuning control system so that the QAMF has a quiescent flat shape in the region of the tracked signal spectrum.

In accordance with one embodiment of the present disclosure a tuning control system is provided for reducing interference in signals coupled from a transmission antenna into a local receive antenna in the presence of a local multi-path. The tuning control system interfaces with a time-delay based lobed filter architecture including delay means for forming synchronously locked lobed filters for both a tuning filter for tracking to a predominant interfering signal inserted at an input port and a bank of filters capable of applying a first order quadratic amplitude matching to effect the amplitude shape desired for distortion matching. The system further includes control means, associated with the delay means, for tuning the QAMF to track the inserted signal and center it at the center of the filter, thereby eliminating the need to interface the control means with the transmitter.

In accordance with one embodiment of the present disclosure, a method is provided for implementing a first-order quadratic correction to the amplitude of an input signal across its band by the use of a quadratic amplitude matching filter (QAMF), the method comprising: dividing an input signal into three parallel branches, dynamically adjusting a delay time (T) in the first branch for tuning a first narrowband RF lobed filter with one of its quiescent lobes peaked on an interfering signal to be tracked, wherein the first narrowband RF lobed filter is broad enough in bandwidth to implement a first path with near-linear and flat amplitude shape, forming a second, more narrowband RF lobed filter in the second branch dependent upon the delay time (T) wherein one of the quiescent lobes of the more narrowband RF filter is peaked on the interfering signal to be tracked but controlled to be more narrow to implement a second path for downward quadratic amplitude adjustment of the inserted signal, forming a simple FIR filter in the third branch dependent upon the delay time, (T), wherein its central form is shaped to form an upward quadratic shape centered on the interfering signal to be tracked, and wherein the FIR filter upward quadratic area is centered on the interfering signal to be tracked to implement a third path for upward quadratic amplitude adjustment of the inserted signal, matching each of the first, second and third branches to have a uniform path delay dependent upon the delay time (T), weighting each of the first, second and third branches according to an external control function, and combining the first, second and third paths into a single output to allow the QAMF to implement a first-order quadratic amplitude distortion of the input coupled transmitted signal to match the delayed coupled signal to that of the propagation path for improved interference cancellation of the inserted signal in an interference cancellation system Also, in accordance with one embodiment of the present disclosure, a method is provided for continuously and automatically tuning a quadratic amplitude matching filter (QAMF) to a band center for improved interference cancellation system performance, the method comprising: a) forming a broadband RF lobed filter having a single quiescent null within a frequency band of interest; b) dynamically adjusting a delay time (T) for tuning the single quiescent null of the broadband RF lobed filter to effectively block the inserted signal to be tracked; c) forming a first narrowband RF lobed filter with a quiescent lobe peak centered on a quiescent null of the inserted signal to be tracked, wherein an output of the first narrowband RF lobed filter output has a near-linear and flat amplitude shape to match a dynamically changing quadratic amplitude distortion of the inserted signal to be tracked; d) forming a second narrowband RF lobed filter with a quiescent lobe peak centered on the quiescent null of the inserted signal to be tracked, wherein an output of the second narrowband RF lobed filter has a downward quadratic amplitude shape to match a dynamically changing quadratic amplitude distortion of the inserted signal to be tracked; e) forming an FIR filter with a quiescent lobe peak centered on the quiescent null of the inserted signal to be tracked, wherein an output of the FIR filter has an upward quadratic amplitude shape to match a dynamically changing quadratic amplitude distortion of the inserted signal to be tracked; f) adjusting an in-line path delay of the first narrowband RF lobed filter, the second narrowband RF lobed filter and the FIR filter to have the same throughput delay; and g) adjusting combining weights of the respective filter outputs of the first narrowband RF lobed filter, the second narrowband RF lobed filter and the FIR filter to implement a corrective quadratic amplitude shaping of the inserted signal, thereby matching a dynamically changing quadratic amplitude distortion of the inserted signal to be tracked.

According to one aspect of the method described above, dynamic adjustment of the time-delay element considers both direction and degree in dependence upon the most recent nulling filter output comparison result.

In different embodiments, the system may be implemented in discreet components or alternatively as a MMIC. Time delays can be implemented as either a switched delay or a continuously variable delay through an analog control voltage.

BRIEF DESCRIPTION OF THE DRAWINGS

These and other objects, features and advantages of the invention will be apparent from a consideration of the following Detailed Description Of The Invention considered in conjunction with the drawing Figures, in which.

DETAILED DESCRIPTION OF THE INVENTION

Figure 1:
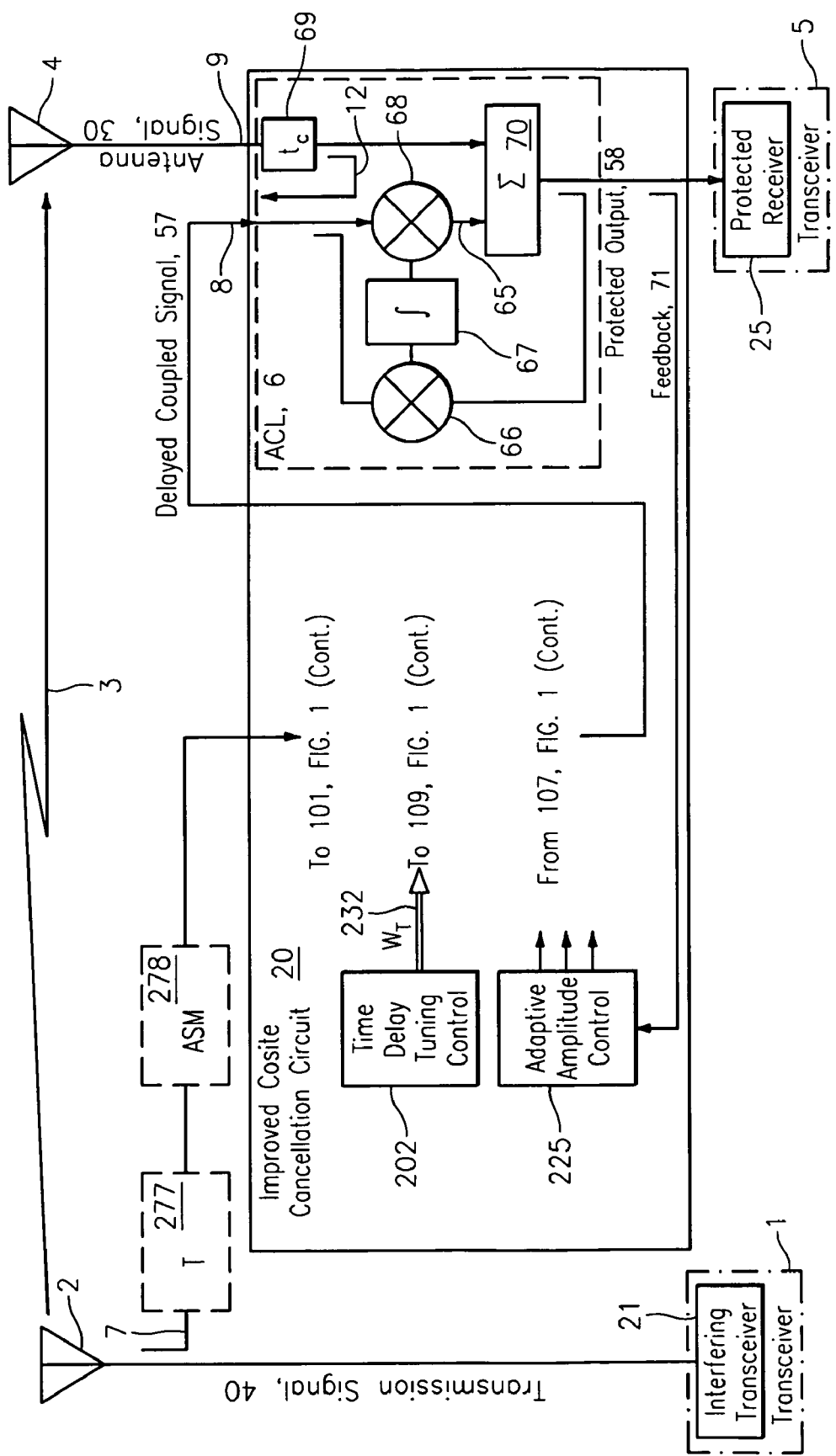
FIG. 1 illustrates the general block diagram of an improved cosite interference cancellation system, according to one embodiment.
Figure 1:
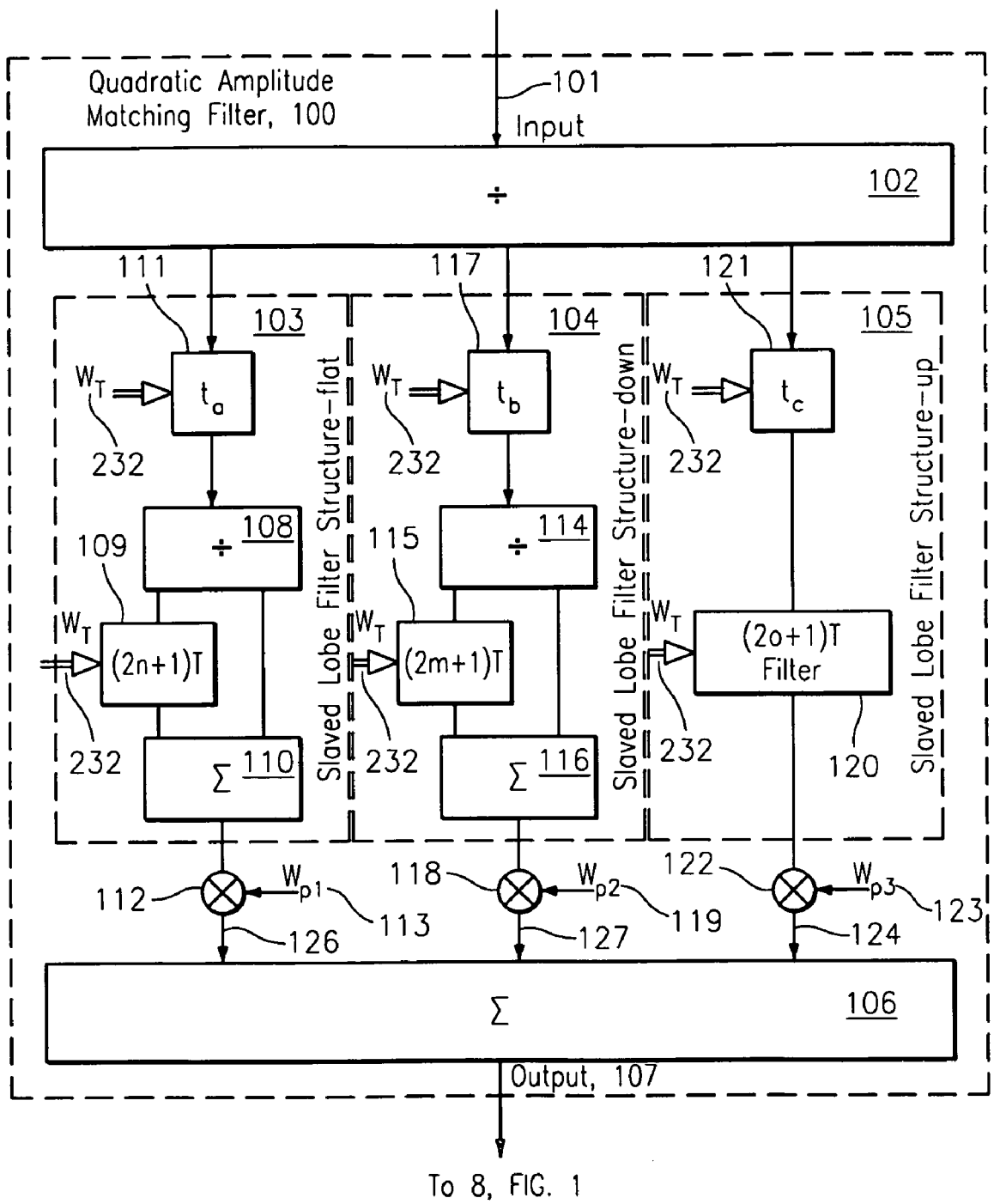

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Overview

The present disclosure is directed to a tuning control system and associated method for continuously and automatically tuning a quadratic amplitude matching filter (QAMF) to a band center of a reference input signal for improved interference cancellation system performance in a cosite interference cancellation system. In some embodiments, the tuning process may be performed off-line to preclude the interruption of processing, during an operation stage, with intermediate or final control signals being transferred to an inline structure to implement the same control.

The present disclosure provides an automated system and method that performs dynamic adjustment of the delay time, tuning a quadratic amplitude matching filter (QAMF) that centers the QAMF filter on the frequency of its reference input signal as a pre-requisite to adjusting the QAMF filter for quadratic amplitude control (i.e., amplitude matching). More particularly, the present disclosure provides a novel quadratic amplitude-matching filter (QAMF) to implement dynamic, real-time correction to the quadratic amplitude mismatch. The present disclosure further provides a time delay tuning control 202, coupled to the quadratic amplitude matching filter (QAMF) to provide frequency tuning to the quadratic amplitude matching filter (QAMF) without the need for an external tuning control signal (e.g., a tuning control signal from the transmitter as practiced in the prior art). It should be understood, however, that quadratic amplitude control is required, as a further processing step beyond performing dynamic, real-time tuning. As is well known, Quadratic amplitude control is performed to adjust the quadratic amplitude-matching filter (QAMF) to the proper weights to match the quadratic amplitude distortion of a sampled transmission signal to that of the propagation path.

Referring now to the drawings, FIG. 1 is a circuit diagram for illustrating an improved cosite cancellation circuit 20 for eliminating interfering signals between radio transmitter 21, as an element of transceiver 1, and receiver 25, as an element of transceiver 5, where system dynamics cause changes in the coupling between transmit antenna 2 and receive antenna 4, co-located on a platform, according to one embodiment.

It should be understood that each of the transceivers 1, 5 function independent of the other such that they alternate in being viewed as either the interfering transmitter or protected receiver depending upon the specific needs of the user. However, the system description will only address a single functional aspect for ease of explanation. The transceivers 1, 5 can operate at any RF frequency including, for example, in the high frequency (HF), very high frequency (VHF) and ultra-high frequency (UHF) spectrums.

The improved cosite cancellation circuit 20 for the elimination of interfering signals between radio transceivers 1, 5, is adapted to be coupled to transceiver 5, in the illustrative embodiment, or other type of device, known or envisioned, capable of receiving electronic signals. The transceiver 1 operating in the transmission mode produces electronic signals for transmission via antenna 2 of transceiver 1. Substantially contemporaneously to this signal transmission, other electronic signals are received by antenna 4 and provided to at least transceiver 5 operating in the receiving mode. As is known to happen, in addition to the signals intended to be received by antenna 4, the co-located transmitter 21 also generates noise and distortion signals which interfere with the electronic signals received by the antenna 4 that are to be provided to a receiver 5.

In order to substantially eliminate the effect of the interfering signals generated from transceiver 1, the novel cancellation circuit 20 is electrically coupled to transmission signal 40. In a preferred form of the present invention, a directional coupler 7 is operatively coupled to the output port of transmitter 21. The cancellation circuit 20 receives a sample of the filtered transmission signal corresponding to the transmitter 1 to which it is coupled.

Operation

In operation, transmitter 21 transmits RF transmission signal 40 through antenna 2 which couples spatially 3 either directly or through a multipath environment into a second antenna 4 connected to a receiver 25 on the same platform as interfering transmitter 21. This coupled energy interferes with the reception in the receiver 25 of its desired reception of a distant transmission. The interfering transmitter 21 thus becomes a collocated source of interference. It is desired to protect the receiver 25 from the interfering transmitter 21. The addition of a simple Interference Cancellation System (ICS) consisting of only a coupled adaptive control loop (ACL) 6 can reduce this interference to a limited extent by sampling the transmission signal 7 and feeding it into the auxiliary port 8 of the ACL 6 while antenna signal 30, including both the interfering propagated reference signal and the desired signal, is fed into the reference port 9 of the ACL 6.

In an environment clear of reflective obstacles (e.g., no multi-path sources present), the spatially coupled signal 3 from antenna 2 to antenna 4 would be received unchanged except for the propagation delay and the quadratic amplitude matching filter (QAMF) 100 would not be required. However, in a typical multi-path laden environment, the spatially coupled signal 3 is distorted across the band in a number of ways, one of them being an undesirable quadratic amplitude distortion across the band of interest which is constant in a stable environment but varies with a changing multipath environment of a platform in motion.

Static v. Dynamic Environments

In a static environment, the cable delay, $T_D$ 277, between sample point 7 and point 8, the input to ACL 6, is ideally adjusted to be the typical coupling delay through space from source antenna 2 to receive antenna 4. This delay, $T_D$ 277, is implemented to include the delay of QAMF 100 and any other in-line delays. The next level of correction is the amplitude slope matching 278 which is ideally adjusted to match the amplitude slope distortion through space from source antenna 2 to receive antenna 4. These corrections will change with time in a dynamic environment but are not the subject of this disclosure. In a dynamic environment, as environmental conditions change with time in an unpredictable manner, a variable quadratic amplitude distortion can be affected upon the propagated signal resulting in an undesirable mismatch between the coupled transmission (i.e., the signal coupled via path 7 to 8) and the propagated transmission (i.e., the signal coupled via path 2-9) limiting the effectiveness of the applied cancellation.

To correct a dynamically changing quadratic amplitude mismatch between the afore-mentioned signals, the present disclosure provides, in one aspect, a quadratic amplitude matching filter (QAMF) 100, generally shown in FIG. 1 and illustrated in more detail in FIG. 7, to implement a dynamic correction to the amplitude slope mismatch between the delayed coupled signal 57 and antenna signal 30, including both the interfering propagated reference signal and the desired signal.

To successfully track and match the distortion introduced by the dispersive propagated interfering propagated reference signal, contained in antenna signal 30, interference cancellation circuit 20 must first continuously and automatically tune a quadratic amplitude matching filter (QAMF) 100, to the reference input interfering transmitted signal 40 band center. This continuous and automatic tuning process comprises a key feature of the invention. In a preferred embodiment, the tuning process is continuously and automatically performed by a local tuning control system (i.e., time delay tuning control 202), as a quiescent starting point for performing subsequent operations such as quadratic amplitude adjustment.

It should be understood that the present disclosure is primarily directed to: (1) an architecture that implements a quadratic amplitude correction, (2) the tuning of the quadratic amplitude matching filter (QAMF) 100 as a pre-requisite to performing quadratic amplitude adjustment, and (3) quadratic amplitude adjustment under control of an adaptive amplitude controller 225 (see FIG. 1*a*). It should be understood that Adaptive amplitude control adjustment 225 uses standard control algorithms and processes, which are well known in the art, and peripheral to the teachings of the present disclosure. However, Adaptive amplitude control adjustment is briefly discussed as follows.

Adaptive Amplitude Adjustment

As is well known, RF spectral amplitude adjustment may be implemented by forming a filter of desired shape. Filters of differing shape can be formed in parallel and a controller can select the best match for the application but there is often no way of knowing a priori which filter will best match the application. Another way of selecting a filter output, or even generating a new filter from a composite of a number of filters, is to weight and sum each of the filter outputs in a variable weighting structure. A controller is provided which has a feedback mechanism such that it can change the weighting and summation network weight values and then evaluate the change. Adaptive amplitude control 225 implements this process by monitoring the protected output 58 of ACL 6 (See FIG. 1*a*) while dithering control lines that adjust the weights of the quadratic amplitude matching filter (QAMF) under a sequence determined by its algorithm and loop feedback.

Figure 2A:
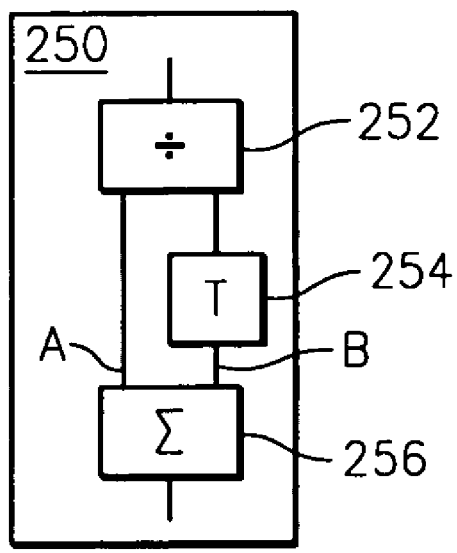
FIG. 2a is a circuit diagram of the general structure of a lobed filter for use in an improved cosite interference cancellation system, according to one embodiment.

Referring now to FIG. 2*a*, a circuit structure is shown for forming a tunable variable lobed filter 250, according to one embodiment. In this embodiment, the tunable variable lobed filter 250 is implemented using a power divider 252, a variable delay 254 and a summing junction 256. The tunable variable lobed filter 250 is tunable by changing the variable delay value [T] 254. Tuning the variable delay value [T] 254 causes expansion and contraction of each lobe from zero and thus a shift of every lobe, beyond the first, up or down in frequency.

Figure 2B:
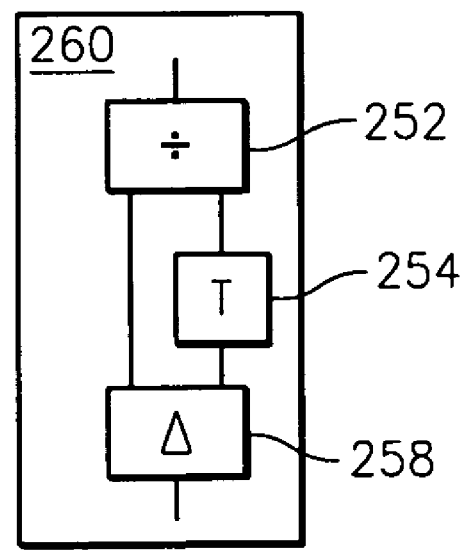
FIG. 2b illustrates the general structure of the lobed filter, for use in an improved cosite interference cancellation system, according to one embodiment.

FIG. 2*b* is an alternative circuit structure 260 of the tunable variable lobed filter 250 implemented with a difference hybrid 258 as a substitute for the summing junction 256. This creates a functionally similar tunable variable lobed filter 250 as described above but has orthogonal lobes to the structure of FIG. 2*a*, providing an important mathematical relationship to be used in control of the tuning process, as discussed immediately below and also further below with reference to FIG. 3.

The inventor has recognized two important mathematical relationships that together allow tuning over a large bandwidth and control of a more narrowband filter to provide the desired amplitude shaping effect. The first important mathematical relationship relates to the orthogonal nature of the sine and cosine function of two RF filters simultaneously formed from the same power divider 252 and time delay structure when combined in either a sum or difference port of the tunable variable lobed filter 250, as briefly discussed above. The first recognized mathematical relationship allows the use of a null at one frequency in a sine filter to align with the lobe of the cosine filter, or vice versa, and can be used as a sensitive tuning control, as illustrated in FIG. 3, and described below.

The second important mathematical relationship is the recognition that two RF filters, one tuned with time delay T and the other tuned with a further time delay (2n+1)T, where n is an integer, will always have lobes co-aligned at the center of the wider band lobe. It is noted that the relationship is one of the further time delay being an odd multiple of a basic delay T. The implications of such a relationship are described in more detail further below with respect to FIG. 4.

Figure 3A:
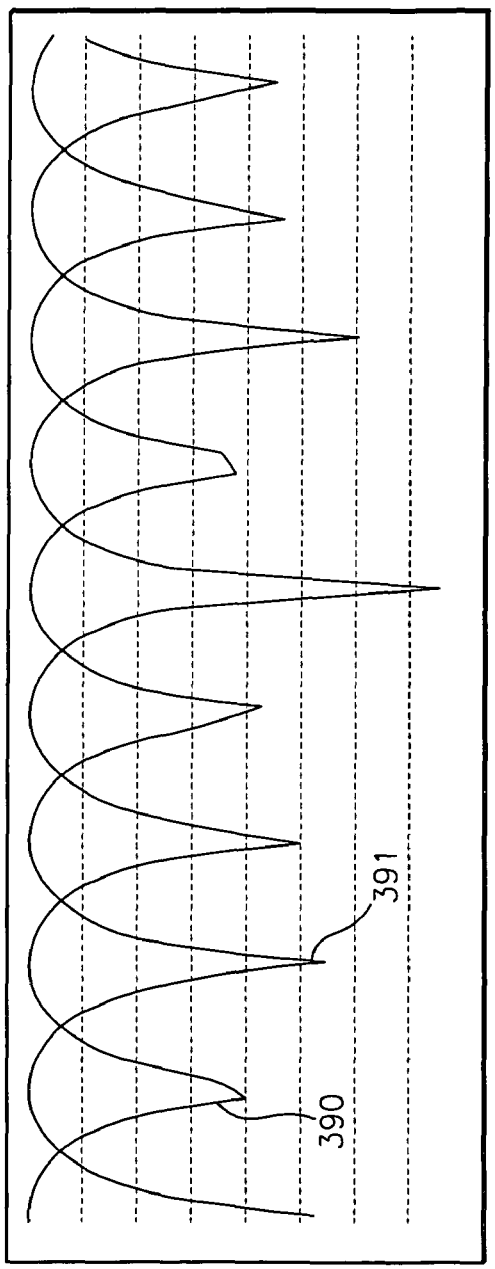
FIGS. 3a-b are exemplary output waveforms of a lobed filter for illustrating that subtraction, rather than summation, of the output of two signal paths of the lobed filter forms an orthogonal filter of the same repetitive bandwidth as the output of the lobed filter from a basic delay (T).
Figure 3B:
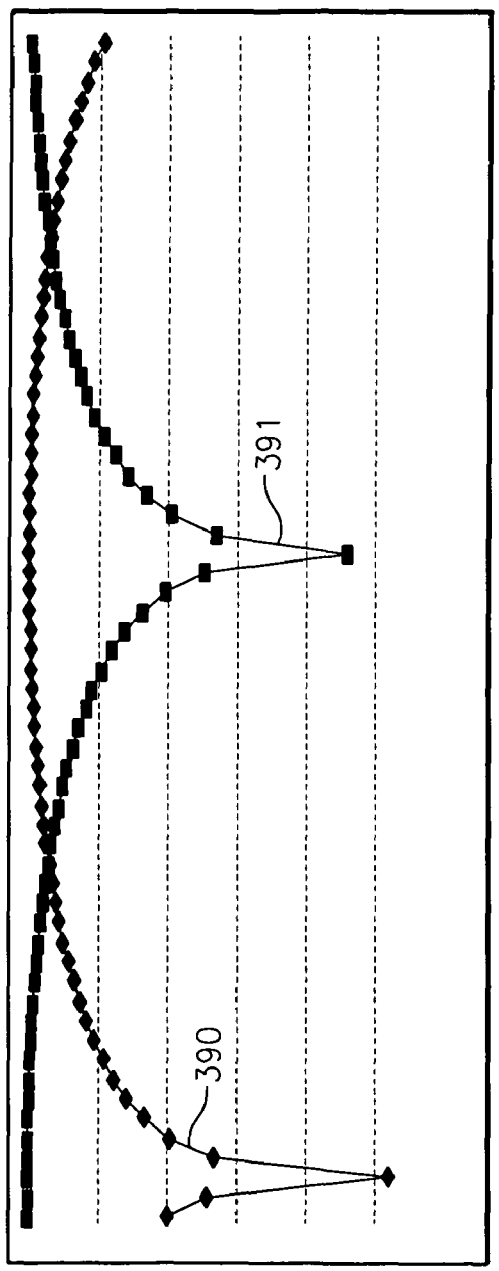

Referring now to FIGS. 3*a*-3*b*, there is shown an output of a lobed filter, such as, for example, the tunable variable lobed filter 250 of FIGS. 2*a* and 2*b*. The output is represented as curve 390 in FIG. 3*a* (and further illustrated in expanded form in FIG. 3*b*).

Referring to FIG. 3*a*, the output 390 of tunable variable lobed filter 250 is shown as a magnitude (cosine) function of the delay difference in the two paths, i.e., path A and path B, shown in FIG. 2*a*. The lobed filter amplitude of output curve 390 of FIG. 3*a* repeats at a regular spacing of $BW_n$ equal to $(2T)^{-1}$. As stated above, in an alternate embodiment, a difference hybrid 258 (See FIG. 2*b*) can be substituted for the summing junction 256 (See FIG. 2*a*) of the tunable variable lobed filter 250 FIG. 2*a*. In such an embodiment, the output 390 of the tunable variable lobed filter 250 follows a magnitude (sine) function, represented as curve 391 in FIG. 3*a*. Thus, a time delay can be selected to have the tunable variable lobed filter 250, 260 extend beyond a band of interest and a corresponding orthogonal filter will have a null within the tuning bandwidth. For example, by extending tunable variable lobed filter 250 of FIG. 2*a* beyond a band of interest it will have a null 390 within the tuning band of interest. As a further example, by extending tunable variable lobed filter 260 of FIG. 2*b* beyond a band of interest, it will have a null 391 within the tuning band of interest.

Figure 4:
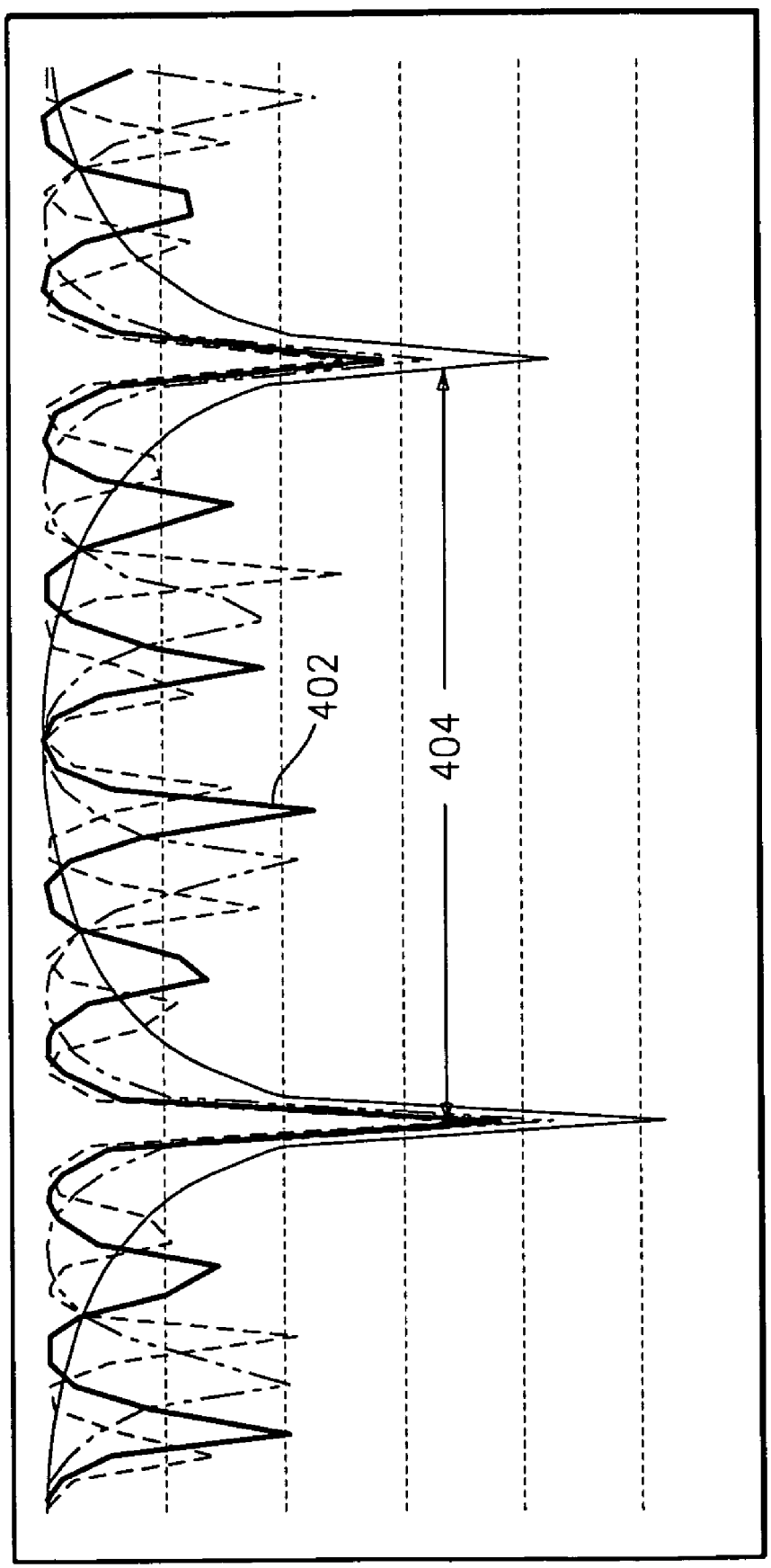
FIG. 4 are exemplary resultant output waveforms of a lobed filter formed from the summed outputs of a lobed filter having signal paths characterized by delays which are odd integer multiples of a basic delay (T), the resultant output waveforms illustrating that a lobe of the summed outputs is always aligned with a lobe of a lobed filter formed from the basic delay (T).

It should be appreciated that the null to null bandwidth, $BW_n$ of the lobed tunable variable lobed filter 250 is inversely proportional to the time delay, T 254, as shown in FIGS. 2*a* and 2*b*. Therefore, an increase in the time delay T 254 reduces the bandwidth $BW_n$ of the tunable variable lobed filter 250. Further, by changing the time delay to be an odd multiple of a basic delay T, for example, by (2n+1)T, where n an integer, the original tunable variable lobed filter 250 is effectively split into (2n+1) lobes. As this always results in an odd number of lobes, one lobe 402, necessarily is always centered with the tuning lobe 404 of a broadband tuning filter, as shown in FIG. 4. This single centered lobe 402 becomes useful in the quadratic amplitude matching filter (QAMF) structure 100 (See FIGS. 7 and 8) to be weighted by the adaptive amplitude control 225 controller to shape the coupled signal to match the propagated interfering propagated reference signal, contained in antenna signal 30 in an interference cancellation system. The value of n used to effectively split the output of the filter into 2n+1 lobes can be adjusted to achieve the desired flatness at quiescent with minimal propagation path distortion as required for slaved lobe filter structure-flat 103 but can also be adjusted to the value m to provide the required quadratic down shaping required for slaved lobe filter structure-down 104. It is also contemplated to use the values of n and m as variables for finer tuning control in future envisioned implementations of the improved cosite interference cancellation system.

Figure 5A:
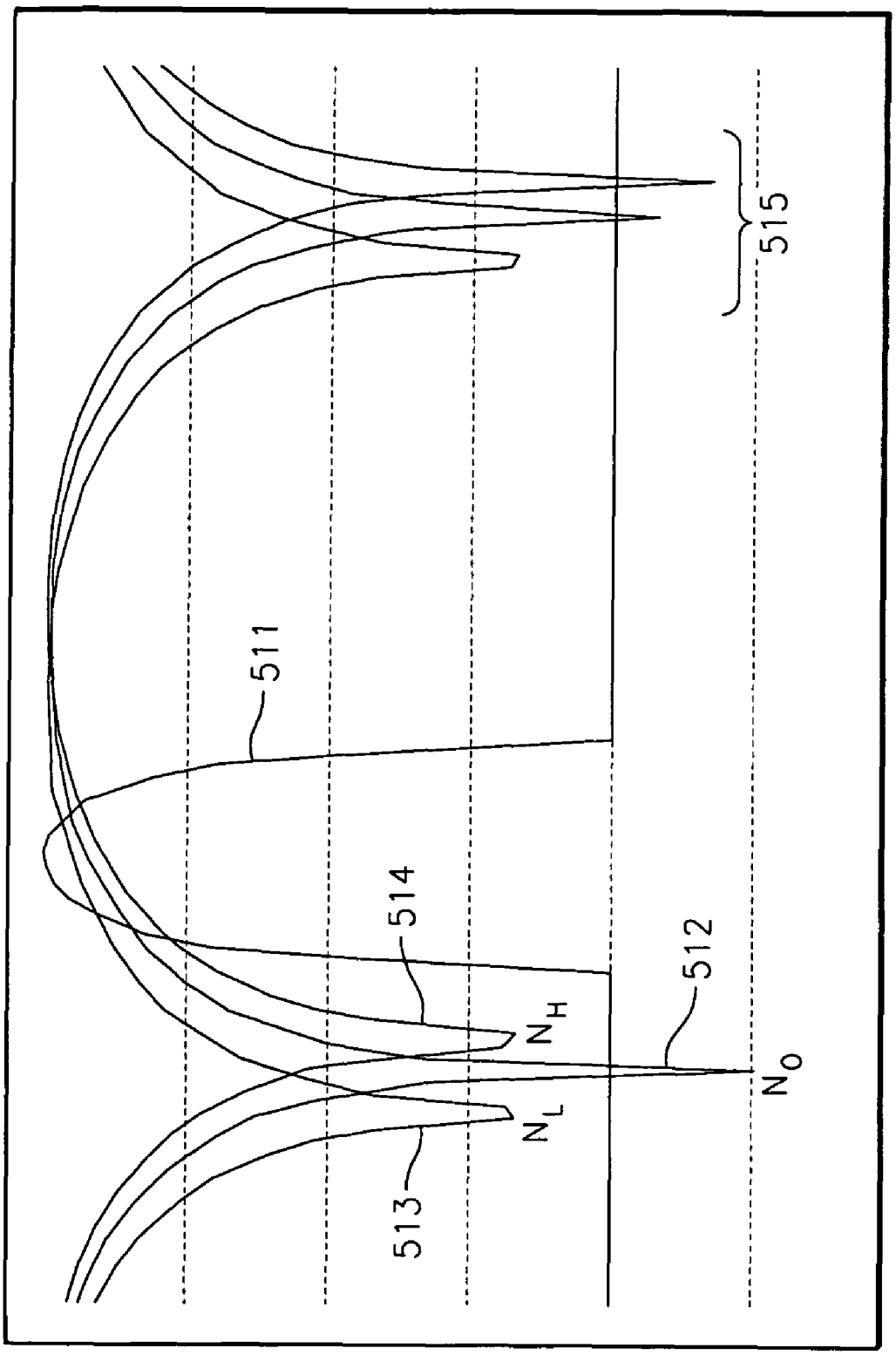
FIG. 5a-c illustrate three different exemplary tuning scenarios of a generated wideband RF lobed filter that is orthogonal to the lobe of an imaginary (unformed) wideband RF tuning filter.
Figure 5B:
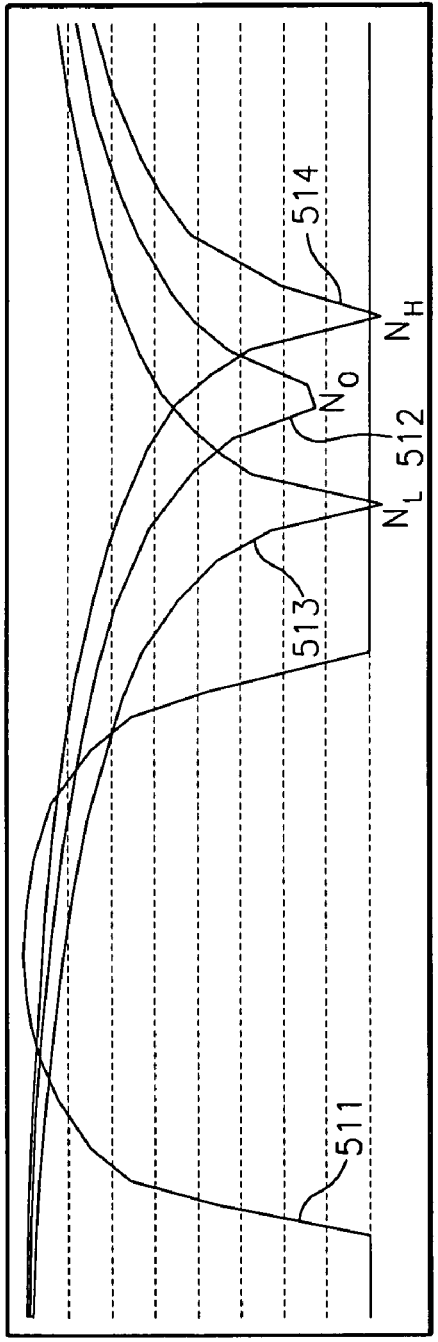
Figure 5C:
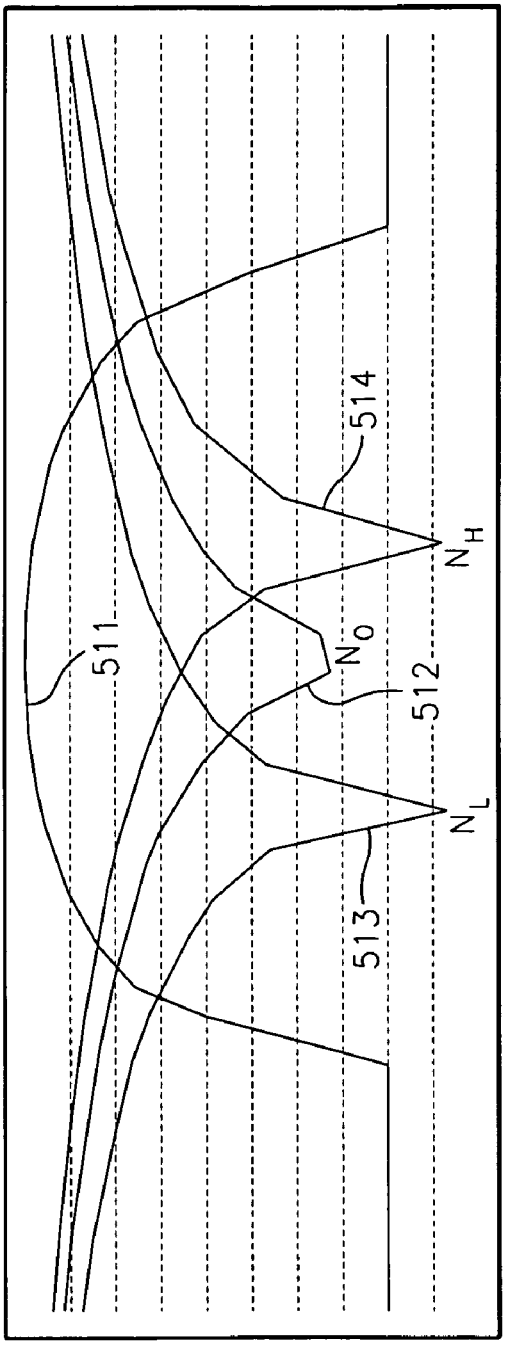
Figure 9:
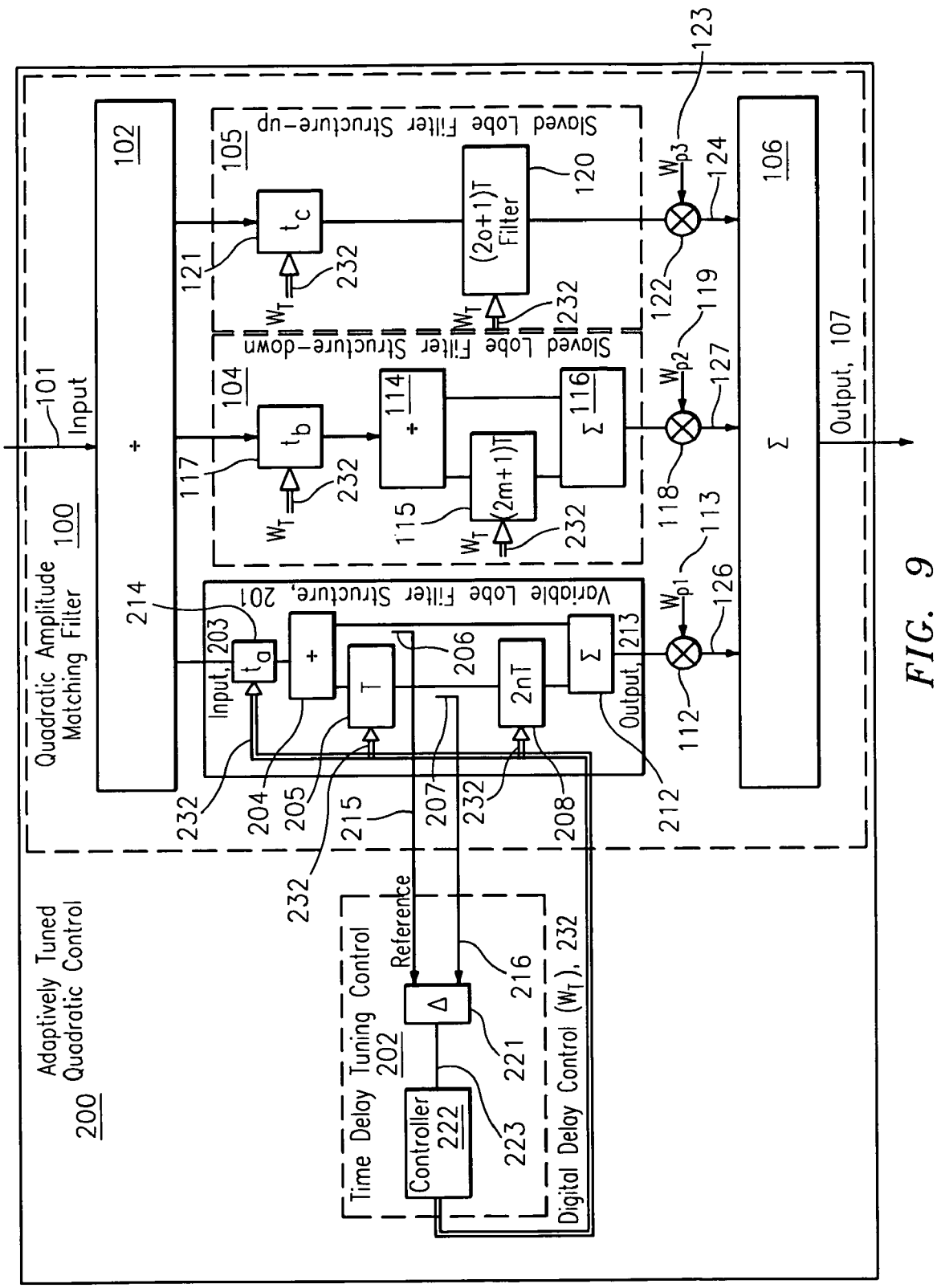
FIG. 9 is a circuit diagram of an adaptively tuned quadratic control (ATQC) structure where the time delay tuning control circuit has been integrated, according to one embodiment.
Figure 10:
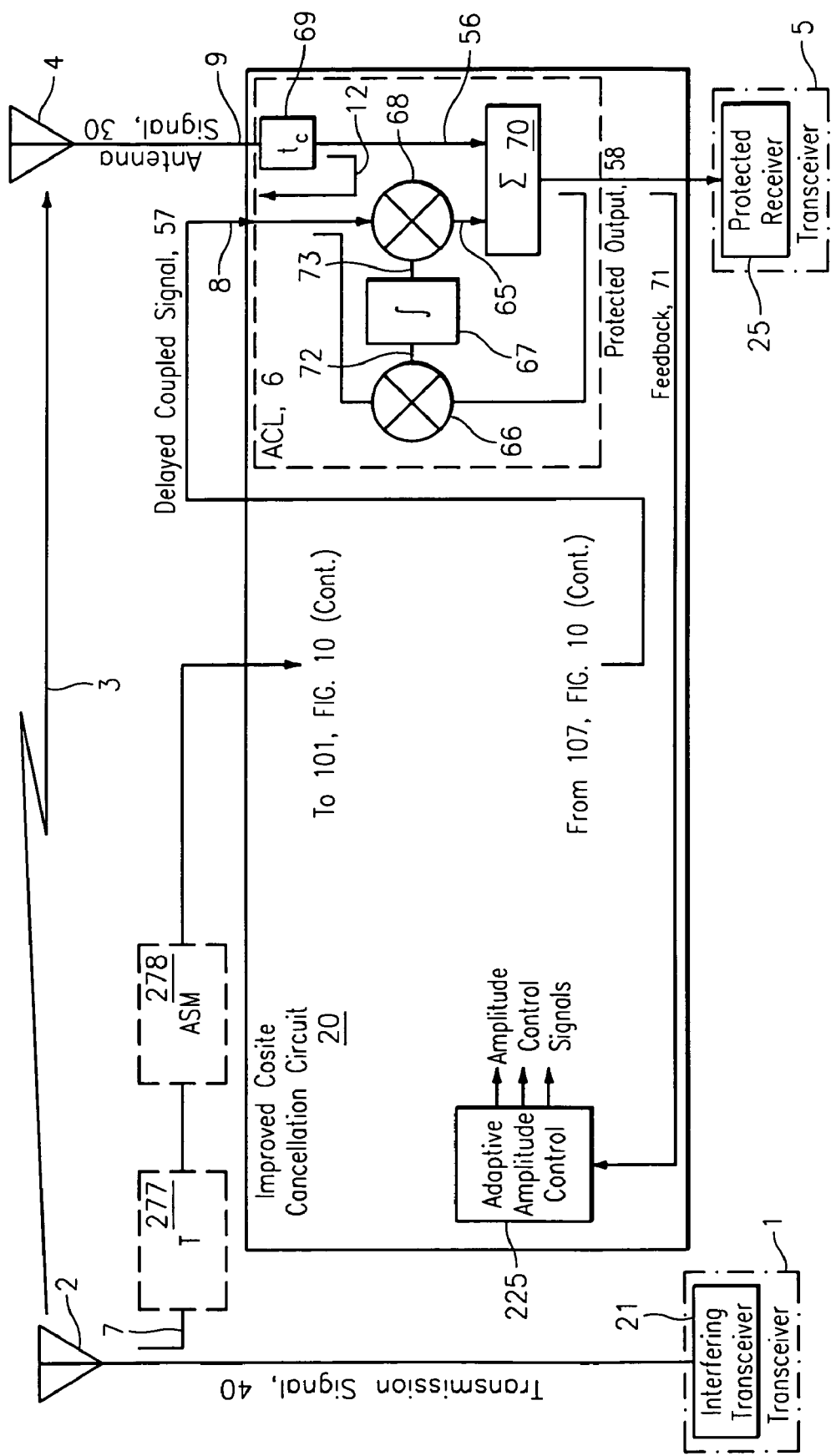
FIG. 10 is a circuit diagram of the adaptively tuned quadratic control (ATQC) of FIG. 9 incorporated into an interference cancellation system to improve the cancellation of a local transmitter signal that is received in the receive antenna with a time varying modulation due to changes in local multipath.
Figure 10:
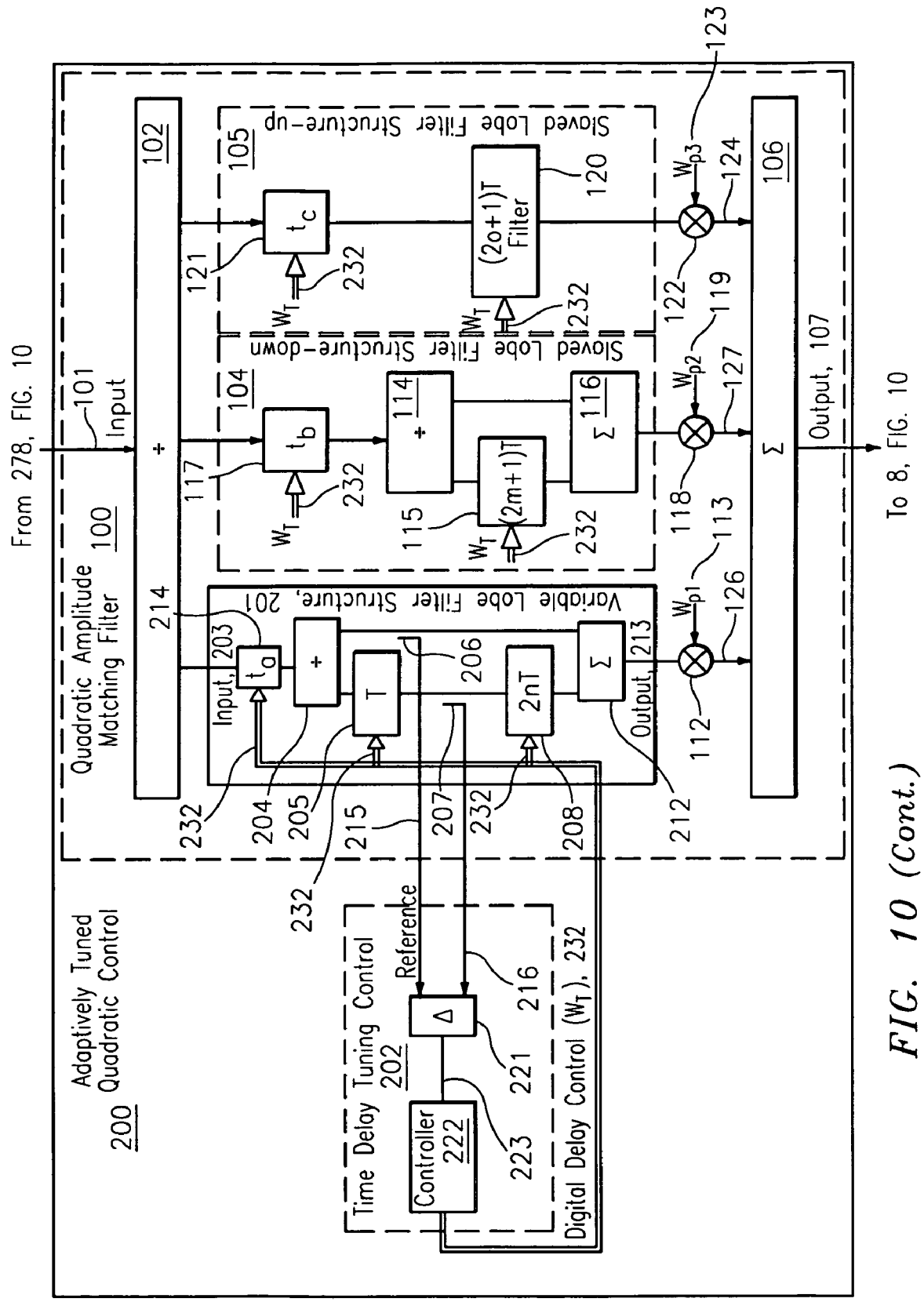

FIGS. 5*a*-5*c* illustrate, by way of example, plots of different exemplary tuning scenarios to further illustrate the concept of generating a lobed filter orthogonal to the lobe of a broadband tuning filter. It should be understood that, in accordance with invention principles, a tuning filter lobe of the broadband tuning filter is not necessary for actual operation, and is not necessarily formed in actual operation. It will therefore be referred to hereafter as a so-called imaginary tuning filter lobe. It should be understood, however that the quadratic amplitude matching filter (QAMF) will track the center of the so-called imaginary tuning filter lobe by use of the orthogonal null formed off-line in the timing delay tuning control (TDTC) 202, as shown in FIGS. 1, 9 and 10. Herein, inline refers to an action or process that generates an immediate change, upon signals passing through, at the output of the circuit where offline refers to action or processes that may use samples of signals passing through but do not impact the signals passing through until a result is reached and a change is made to the inline processes.

Each of the plots of FIGS. 5a-5c illustrates a common insertion signal 511 to be tracked. The insertion signal represents the sample of transmitted signal 40 to be matched to an undesirable multipath signal received in antenna signal 30 to be cancelled by the improved cosite cancellation circuit 20 of FIG. 1.

Referring first to FIG. 5a, four output filter curves are shown 511, 512 $N_O$, 513 $N_L$, 514 $N_H$. Output filter curves 512 $N_O$, 513 $N_L$ and 514 $N_H$ represent three different filters tuned with a so-called imaginary tuning filter lobe but orthogonal to the imaginary tuning filter lobe such that nulls of the orthogonal filter are aligned with the peak of a lobe of the original filter formed by the same delay, T. A first filter output curve 512 $N_O$ represents the null portion of a lobed filter, $N_O$, formed by current value of delay T, orthogonal to the tuning filter tuned on frequency with the imaginary tuning filter by using the same delay T used to form the tuning filter. Using the same delay used to form both the first filter output curve 512 $N_O$ and the imaginary tuning filter, results in a null of the first filter output curve 512 $N_O$ aligned with the imaginary tuning lobe of the tuning filter, as shown in FIG. 3.

A second filter output curve 513 $N_L$ represents the null portion of a lobed filter, $N_L$, formed by delay T+ΔT, an incremental step of delay time T 254 of the circuit of FIG. 2 tuned low in frequency with a path delay difference of T+ΔT and results in a null below, or lower than the current center frequency of the imaginary tuning lobe of the broadband lobed filter.

A third filter output curve 514 $N_H$ represents the null of the lobed filter, $N_H$, is tuned high in frequency with a path delay difference of T−ΔT and results in a null above, or higher than, the current center frequency of the imaginary tuning lobe of the broadband lobed filter.

With continued reference to FIG. 5a, there is shown the condition in which the filter, $N_O$, is centered at a frequency that is below the frequency of the insertion signal 511. In this case, the filter $N_H$ allows more of the inserted signal energy of the inserted signal 511 through, than the filter $N_L$ thus providing feedback to the interference cancellation system to move the tuning filter higher in frequency by decreasing the delay, T.

FIG. 5b illustrates the case in which the filter, $N_O$, is centered at a frequency that is above the frequency of the insertion signal 511. In this case, the filter $N_L$ allows more of the inserted signal energy of the inserted signal 511 through, than the filter $N_H$ thus providing feedback to the interference cancellation system to move the tuning filter lower in frequency by increasing the delay, T.

FIG. 5c illustrates the case where conditions when the filter, $N_O$, is centered on the inserted signal. In this case, the low and high filters, $N_H$ and $N_L$, will pass equal amounts of the inserted signal energy, thus providing no feedback to change frequency by changing the delay, T. This state represents a point of stability in tuning such that, as the null of the orthogonal filter is aligned with the inserted signal and thus aligned with the peak of the center of the lobe of the imaginary tuning filter, the inserted signal is thus aligned with the peak of the quadratic amplitude matching filter (QAMF) center.

It should be understood that the direction of the null shifts as a function of the time delay introduced by the interference cancellation system is inherent to lobed filters which are comprised of a plurality of nulls originating at zero Hz and repeating at a regular spacing of $(2T)^{-1}$. Thus an increase in delay T reduces the effective $BW_n$, thereby compressing the lobing and shifts the current null to the left, i.e., lower in frequency.

Referring again to FIG. 5a, the center null 512 $N_O$ is representative of a filter output null which is orthogonal to the corresponding filter output formed by the summation of the output of filter signal paths with path delay differences formed by the inline delay T.

The left null 513 $N_L$ represents the null of a filter output having a path delay T+Δt, the output exhibiting a slightly more narrow lobed structure than the output of a filter signal path having a path delay T, and thus the repetitive lobing shifts to the left, lower in frequency, moving the null below the nominal location using delay T.

The right null 514 $N_H$ represents the null of a filter output having a path delay T−Δt, the output exhibiting a slightly wider lobed structure than the output of a filter signal path having a path delay T, and thus the repetitive lobing shifts to the right, higher in frequency, moving the null above the nominal location using delay T.

It should be appreciated that these two filter output curves 513 $N_L$, 514 $N_H$ advantageously allow different amounts of the incident signal energy to pass through them. In this manner, measurement of the energy from the respective filter outputs provides information on a corrective direction in frequency of the tuning lobe orthogonal filter required for proper tuning.

With continued reference to FIG. 5a, this figure further illustrates a set of undesirable image nulls 515. It is appreciated that these undesirable image nulls 515 are a limitation to the tuning bandwidth of the tuning control system. They arise by using too large of a value of delay T, resulting in an excess of narrow lobes for tuning. It therefore follows that it is desirable to have as large a tuning bandwidth as possible to preclude the creation of these image nulls. It is preferred that tuning to the low edge of the frequency tuning band cannot allow image nulls to approach the high band limit for inserted signal, or vice versa, or the system may shift lobes of the tuning filter upon a jump in transmitted signal frequency, and cause significant change in subsequent filter bandwidths and thus shaping amplitude factors. The narrowband filter cannot be used for tuning because of this limitation. This shows the importance of the recognition of the lobe alignment for filters formed by T and (2n+1)T delays so that the tuning filter lobe can be very broad for a broad tuning range but still be used to focus a much more narrow lobe for quadratic amplitude matching filter (QAMF) function.

As stated above, a primary objective of the tuning control system of the present disclosure is to continuously and automatically tune a quadratic amplitude matching filter (QAMF) to an interferer band center as a quiescent starting point for performing quadratic amplitude control adjustment. While it is understood that amplitude control adjustment is not central to the teachings of the present disclosure, it is understood that it is implemented by controlling the weights of the tuned quadratic amplitude matching filter (QAMF), tuned in accordance with invention principles.

Figure 6:
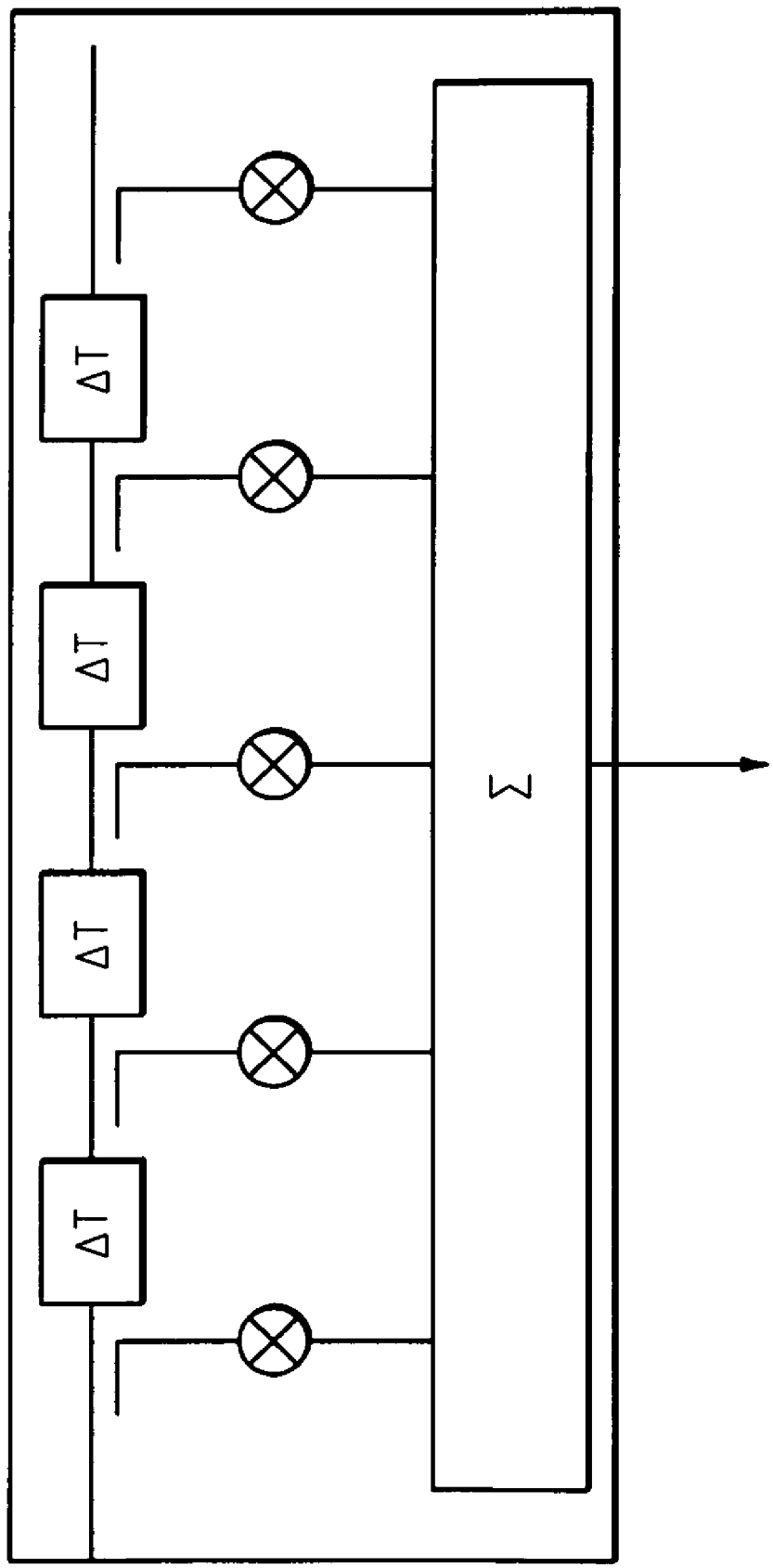
FIG. 6 is a block diagram of a five-tap finite impulse response (FIR) filter whose pass-band amplitude repeats in the frequency domain, according to one embodiment.

The tunable variable lobed filter 250 structure cannot provide the necessary shaping required for the slaved lobe filter structure-up 105 of the quadratic amplitude matching filter (QAMF). A finite impulse response filter with structure shown in FIG. 6 can provide the shape required while maintaining linear phase.

Figure 7A:
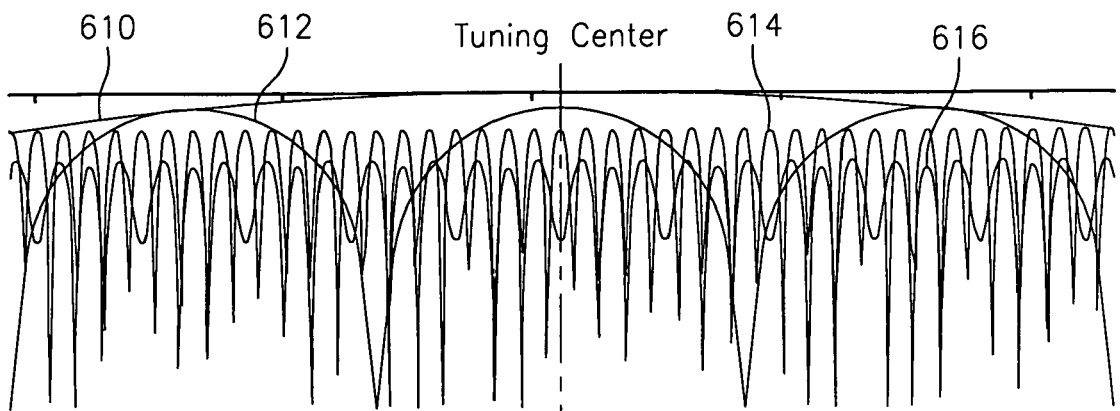
FIG. 7a is a plot comprising four curves, a first curve representing the output of a lobed broadband tuning filter, the second curve representing a lobed narrowband tuning filter, a third curve representing a narrower lobed narrowband filter and a fourth curve representing an FIR filter.
Figure 7B:
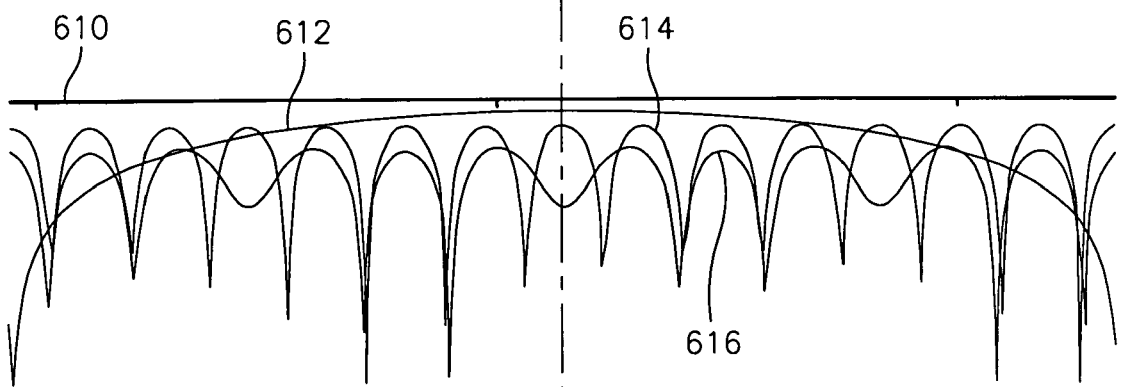
FIGS. 7b & 7c are plots representing the four curves of FIG. 7a in increasingly expanded form.
Figure 7C:
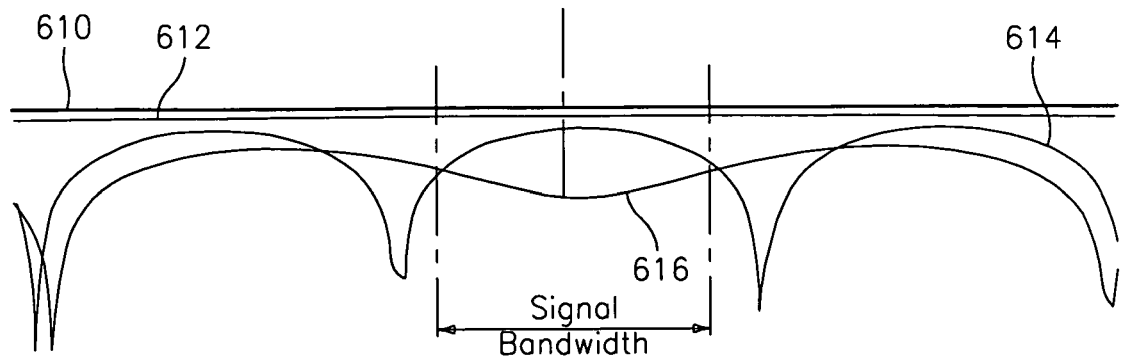

Referring now to FIGS. 7a-7c, there is shown, by way of example, a plot of four curves. For ease of explanation, each signal has been offset in level for clarity and each successive plot is an expansion of the center area of the previous plot, as indicated by the common centerline.

The first curve 610 is representative of an imaginary broadband tuning filter formed by a delay interval T, corresponding to an off-line lobed tuning filter with an orthogonal null to allow it to track an incoming signal of interest. The second curve 612 is representative of a lobed filter tracking the tuning filter with a delay interval (2n+1)T, where n is some integer multiplier of T. In this case, the lobed filter tracks the off-line broadband tuning filter null, as is true of the first curve 610 formed with a delay T, however, in the present case, the filter is more narrow in bandwidth although still nearly flat in the region of the bandwidth of signal of interest, as generated by Slaved lobe filter structure-flat 103 and output at 112 (See FIGS. 1 and 8).

Figure 8:
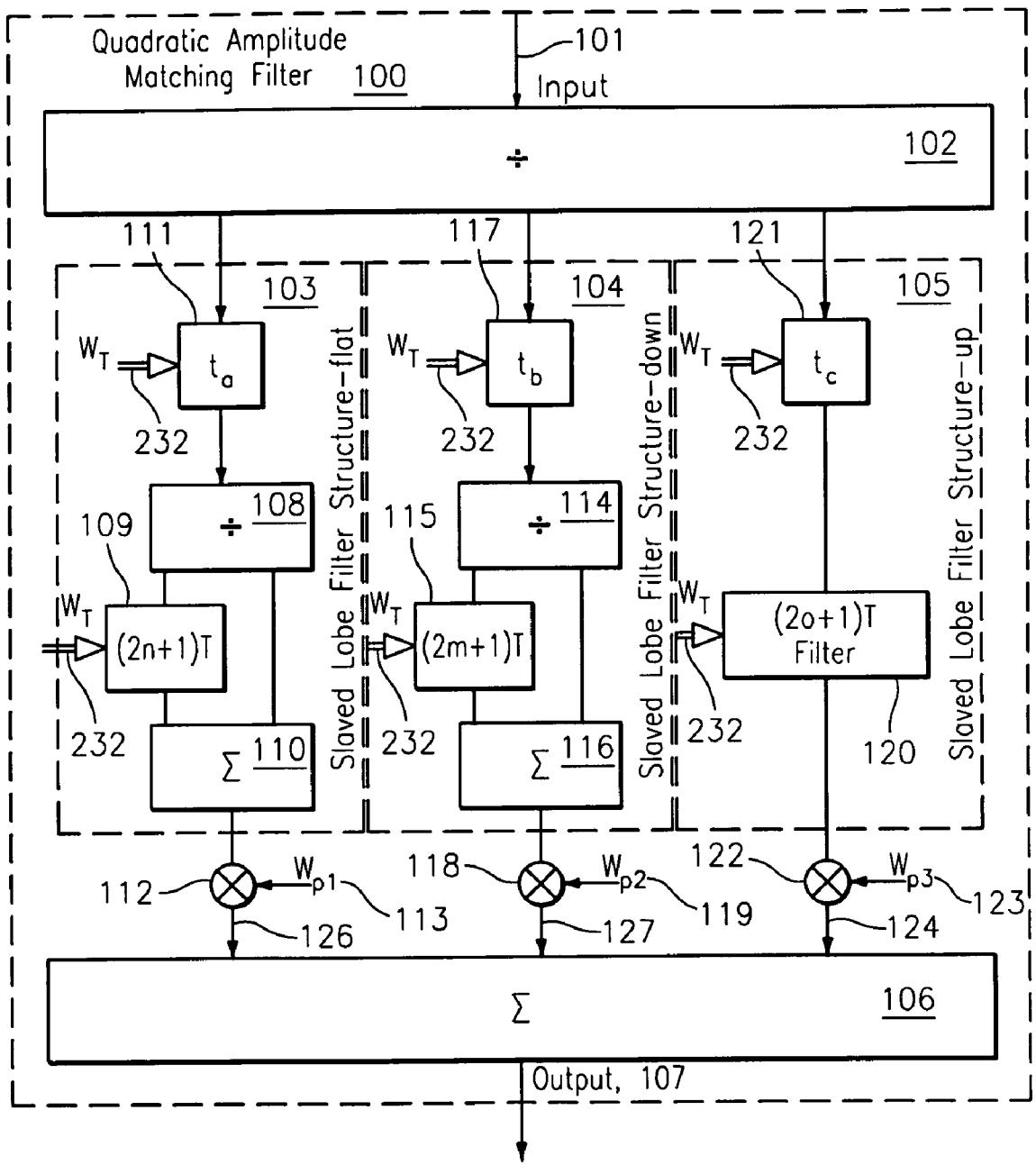
FIG. 8 is a circuit diagram of a quadratic amplitude matching filter (QAMF) structure where the tuning control comes from an external controller, according to one embodiment.

The third curve 614 is representative of the lobed filter tracking the tuning filter with a multiplier value of m=28 in the present example such that it tracks the imaginary broadband tuning filter lobe center and the slaved lobe filter structure-flat 103 (See FIGS. 1 and 8). This lobe structure is even more narrow in bandwidth than the lobe structure generated by slaved lobe filter structure-flat 103 and output at 112 (See FIGS. 1 and 8). The presently described lobe structure has amplitude shaped as a down quadratic in the region of the bandwidth of signal of interest, i.e., the "signal bandwidth" region, as generated by slaved lobe filter structure-down 104 and output at 118.

The fourth curve is representative of a more complex FIR filter (e.g., formed using 5 taps by way of example and not limitation). In this embodiment, weights having values of 1.0, 1.0, −1.0, 1.0, 1.0 are used to create an upward quadratic curve in the region of the signal of interest as generated by slaved lobe filter structure-up 106 and output at 122. Further, the tuning filter is tracked using a tap spacing of T with multiplier of o (o=14 in this example) such that it tracks the tuning filter lobe center, the slaved lobe filter structure-flat 103 and the slaved lobe filter structure-down 104.

Referring now to FIG. 7c, there is shown a region labeled "Signal Bandwidth" for illustrating the alternate signal path amplitude filter shapings, before weighting and combining, implemented upon the coupled transmitted signal 40 (see FIG. 1a) in the quadratic amplitude matching filter (QAMF) 100. The coupled transmission signal 40 is desirably shaped by a cosite cancellation circuit 20 of the protected receiver 25 for the purpose of matching the distortion introduced in the propagated interfering propagated reference signal, contained in antenna signal 30 for improved interference cancellation.

FIG. 8 is a more detailed circuit diagram of the quadratic amplitude matching filter (QAMF) 100 of FIG. 1. In the presently described embodiment, a quadratic amplitude adjustment 100 is implemented as a block of three parallel filters 103, 104, 105, each respectively formed in standard finite impulse response filters having different characteristics of amplitude shapings across the band of interest and each being formed based upon different odd integer multiples of a basic delay interval T which tunes such structures to a central band of interest of an interfering signal.

The three parallel filter blocks include the slaved lobe filter structure-flat block 103, the slaved lobe filter structure-down block 104, and the slaved lobe filter structure-up block 105. Each filter block 103, 104, 105 uses a common digital control signal $W_T$ 129 as a tuning signal to track a center frequency with different relative bandwidths, to be described as follows.

Slaved lobe filter structure-flat 103 includes an equalizing delay block and a simple filter. The signal enters a time delay $t_a$ 111 controlled by the $W_T$ 129 but internal circuitry is designed to adjust the setting of the delay implemented in $t_a$ 111 to cause the total delay through the slaved lobe filter structure-flat 103 to that matching the simultaneous delays through slaved lobe filter structure-down 104 and slaved lobe filter structure-up 105. The delayed signal enters the simple filter at a power divider 108 forming two paths, one of which feeds directly into one port of a summing junction 110 while the second path enters a controlled delay line 109 which is set to a delay (2n+1)T by the same control $W_T$ 129 before entering a second port of the summing junction 110. This delay corresponds to the delay that would tune a similar lobed filter used for amplitude slope control to the band of interest and bandwidth such that it is nearly flat in the region of the signal of interest. The signal exits the summing junction and enters a weighting device Slaved lobe filter structure-down block 104 is the same structure as slaved lobe filter structure-flat block 103 except that the filter time constant for Slaved lobe filter structure-down block 104 is increased to narrow the lobing of the filter to generate a quadratic shape in the area of the signal of interest.

Slaved lobe filter structure-down block 104 includes an equalizing delay block 117 and a simple filter. The signal enters a time delay $t_b$ 117 controlled by the same $W_T$ 129. Internal circuitry (not shown) is included in slaved lobe filter structure-down 104 to adjust the setting of the delay implemented in $t_b$ 117 to cause the total delay through the slaved lobe filter structure-down block 104 to match the simultaneous delays through slaved lobe filter structure-flat block 103 and slaved lobe filter structure-up block 105. The delayed signal enters the simple filter at a power divider 114 forming two paths, one of which feeds directly into one port of a summing junction 116 while the second path enters a controlled delay line 115 which is set to a delay (2m+1)T by the control $W_T$ 129 before entering a second port of the summing junction 116. This delay is based upon the same tuning interval T but has a multiplier of (2m+1). Multiplier m establishes the relative bandwidth of the quadratic filter shaping.

Slaved lobe filter structure-up block 105 includes an equalizing delay block 121 and a simple FIR filter. The signal enters a time delay $t_c$ 121 controlled by the same $W_T$ 129 but internal circuitry is designed to adjust the setting of the delay implemented in $t_c$ 121 to cause the total delay through the slaved lobe filter structure-up block 105 to that matching the simultaneous delays through slaved lobe filter structure-flat block 103 and slaved lobe filter structure-down block 104. The delayed signal enters the finite impulse response (FIR) filter 120 of multiple taps spaced at intervals based upon the same tuning interval T but having a multiplier of (2o+1) and individually weighted to generate the desired upward quadratic function at the frequency of the signal of interest. The multiplier o will cause the filter function to track the signal of interest as the frequency changes and the circuit is tuned in response.

The outputs of the three slaved lobe filter shaping structures 103, 104, 105 are each respectively weighted and summed to generate the amplitude shaping necessary to match a received signal which has been distorted in a dispersive multipath propagation path from a co-located transmission antenna 2. Quiescent values of $W_{p1}$ 113, $W_{p2}$ 119, and $W_{p3}$ 123 will be (1.0, 0.0, 0.0), providing minimal shaping are modified thereafter by the adaptive amplitude control 225.

FIG. 9 provides the circuit structure of a tuning control system, according to one embodiment, for continuously and automatically tuning a quadratic amplitude matching filter (QAMF) 100 to a band center of a reference input signal for improved interference cancellation system performance in a cosite interference cancellation system.

An Adaptively Tuned Quadratic Control (ATQC) module 200 comprises two main elements; an inline quadratic amplitude matching filter (QAMF) 100 and an offline Time Delay Tuning Control (TDTC) element 202. The quadratic amplitude matching filter (QAMF) 100 further includes a variable lobe filter structure (VLFS) 201, slaved lobe filter structure-down 104 and a slaved lobe filter structure-up 105. It is noted that Variable lobe filter structure (VLFS) 201 is a variation of slaved lobe filter structure-flat 103 of FIG. 1 with the time delay structure split into two blocks to provide a tuning feed.

The variable lobe filter structure (VLFS) 201 implements the functionality of a tuned and quiescent amplitude slope matched filters of the prior art but is constructed in a novel manner as a variation of a conventional in-line Lobe Filter Structure such that the delay line forming the lobed filter is split into two blocks of controlled variable time delay. Specifically, the delay line is split into a first block 205 with delay T and a second block 208 with delay 2nT, yielding a total delay of (2n+1)T. The first block 205 is used for broadband tuning and the second block 208 is implemented as a multiple of the first block 205, thus making the nearly-flat path more narrowband. As discussed above, a resulting nearly-flat path filter lobe formed by the (2n+1)T relationship is centered in the lobe of an imaginary filter orthogonal to the null of the broadband tuning filter lobe formed by the delay T but is never actually formed. This establishes one path of the quadratic amplitude matching filter (QAMF) 100. The other two paths are slaved to the tuning value T and thus track the inserted coupled transmitted signal. The weights on the three paths are then adjusted for quadratic amplitude matching, as taught above and then fed into port 8 of the ICS for improved interference cancellation, advantageously requiring no control signals from the transmitter.

The Timing Delay and Tuning Control (TDTC) module 202 uses signal samples output from the variable lobe filter structure (VLFS) 201 to control the first block, T 205 for tuning, which is central to the teachings of the present disclosure, and the second block, 2nT 208, to implement the lobed filter function-flat used by the interference cancellation system, which is a pre-requisite for implementing the amplitude slope adjustment to match the propagated path of the interfering signal.

It should be understood that the tuning filter lobe is referred to herein as imaginary in the sense that it is never actually formed or used in actual operation but is instead discussed herein to provide a more complete understanding of the interrelationships of the various control signals and the generation of the ASMF filter.

With continued reference to FIG. 9 reference signal 215 and delayed signal 216 are sampled and fed into a differencing hybrid 221 to form a broadband RF filter, a first broadband RF filter having a filter response 223. Thus the offline sine function filter formed using the variable T 205 has a null orthogonal to the center of the imaginary tuning filter lobe based upon this T, which is never formed.

In accordance with a method for continuously and automatically tuning a quadratic amplitude matching filter (QAMF) 100 to a band center for improved interference cancellation system performance, the energy passing through the filter is measured by controller 222. The controller can then dither the digital delay control 232 by a value ΔT, either positive or negative and re-measure the energy passing through the filter. In this way, the controller can determine direction to skew the tuning filter to achieve a null on the input signal 203. This assumes increasing a control voltage causes the delay T to be increased resulting in a narrowing of the filter lobes while decreasing the control voltage causes the delay T to be decreased resulting in a broadening of the filter lobes. Signs can be easily changed for devices with opposite control functions. There are a number of search algorithms common in the art to perform this control that provide for desired rejection of noise and timely convergence. These include but are not limited to random searching, gradient searching, and perturbation using orthogonal Walsh functions, each with advantages and disadvantages. The selected control algorithm is not part of this present disclosure.

FIG. 10 is a more detailed circuit diagram of FIG. 1 for illustrating an improved interference cancellation circuit 20 for elimination of interfering signals between radio transmitter 21, and receiver 25 where system dynamics cause changes in the coupling between a transmit and receive antenna on a platform, according to one embodiment.

A time delayed, quadratic amplitude matched sample of transmission signal 40 is output from adaptively tuned quadratic control 200 as the delayed coupled signal 57 and supplied to auxiliary port 8 of ACL 6. Interfering propagated reference signal, contained in antenna signal 30 is fed into reference port 9 of ACL 6. A cancellation signal 65 is generated by ACL 6 via the processes of autocorrelation 66, integration 67, and finally by applying a complex weight 68 of phase and amplitude. The cancellation signal 65 is provided to summing junction 70. It is noted that when the cancellation signal 65 is injected into summing junction 70 it has substantially the same amplitude as the interfering propagated reference signal, contained in antenna reference signal 71, however, the cancellation signal 65 is manipulated so that it is 180° out of phase with the interfering propagated reference signal received by antenna 4 and included in antenna signal 30 so as to substantially cancel the interfering signal. The adaptive amplitude control 225 of prior art is still required to adjust the quadratic amplitude matching filter (QAMF) 100 to the proper weights to match the quadratic amplitude distortion of the sampled transmission signal to that of the propagation path. Adaptive amplitude control 225 implements this process by monitoring ICS protected output 58 while dithering control lines $W_{p1}$ 113, $W_{p2}$ 119, and $W_{p3}$ 123 under a sequence determined by its algorithm and loop feedback. As a result, the signal remaining on the protected output 58 is substantially the same as the received antenna signal 30 provided by receiver antenna 4 without the undesired contribution from interfering transmitter 1. ACL 6 is configured as a Least Mean Square (LMS) analog control loop but those familiar with the art will realize that many different algorithms, implemented at RF and digital, can serve this function.

The use of sum or difference hybrids in the off-line processing and in-line processing may be switched to design the system for a specific tuning band and slope control lobed filter width. This embodiment is just one configuration.

If the tuning information is available from the transmitter, it could be used for a table lookup of the starting point for the value of T. Thus, when the transmitter switched frequency, tuning would start at approximately the correct value. These stored values may be a one-time set value at manufacture or may be updated every time the frequency is visited.

Figure 11:
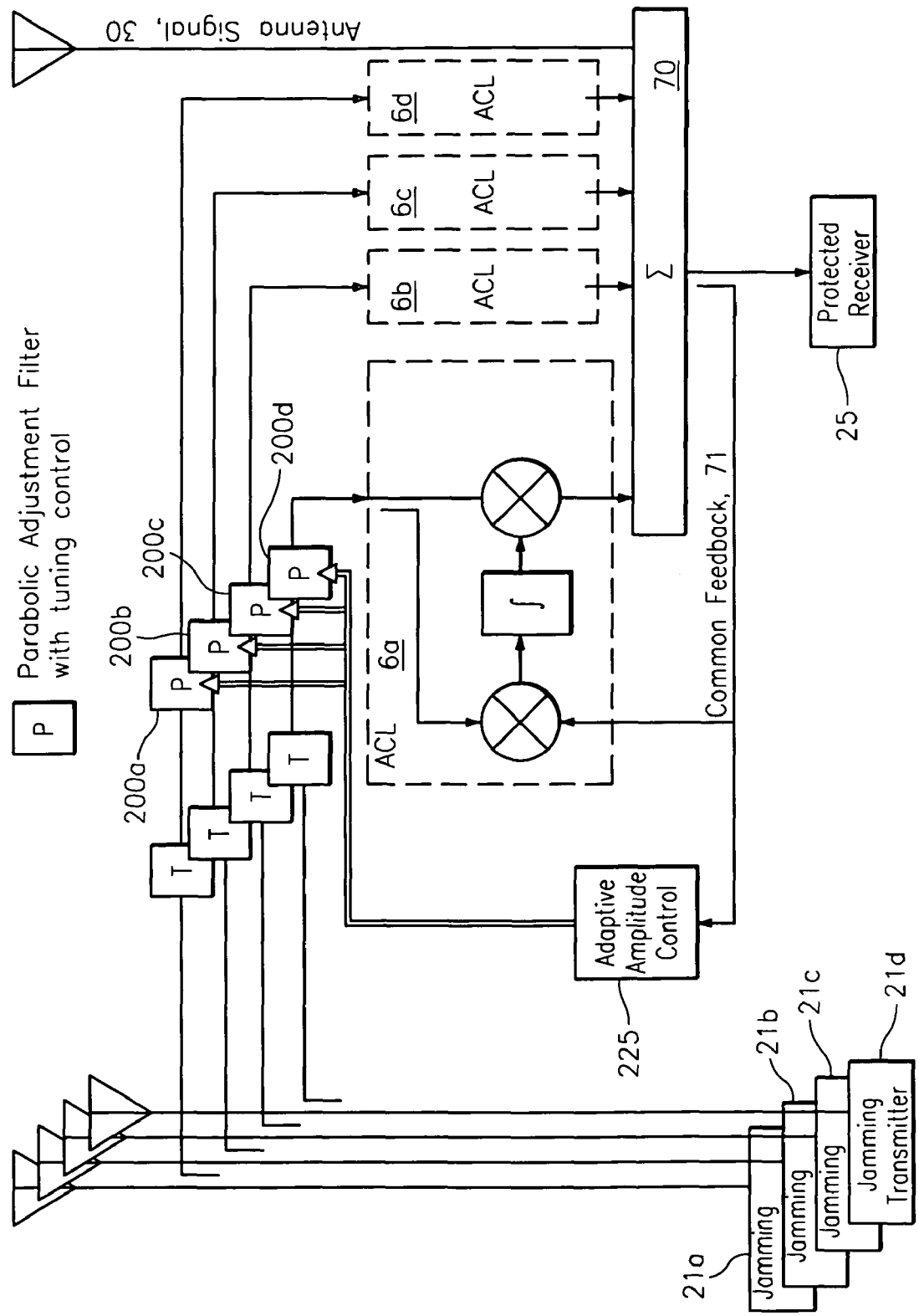
FIG. 11 illustrates one embodiment of an improved cosite interference cancellation system 20 for elimination of interfering signals between three or more co-located transceivers

Referring now to FIG. 11 there is shown four co-located interfering transmitters 21a-21d, by way of example and not limitation. Four are shown for ease of explanation. To counteract the multiple interfering transmitters 21a-21d, and thus reduce or minimize cosite interference, the improved cosite interference cancellation system 20 includes a common adaptive amplitude control 225 of prior art operably coupled to a common summing junction for four Interference Cancellation Systems (ICS) 6a-6d, and four independent Adaptively Tuned Quadratic Control (ATQC) module 200a-200d comprised of two main elements; an inline quadratic amplitude matching filter (QAMF) 100 and an offline Time Delay Tuning Control (TDTC) element 202 operably coupled to a common summing junction for four Interference Cancellation Systems (ICS) 6a-6d. Four of which are shown for ease of explanation and not limitation. In this manner, the cosite interference cancellation process described above with reference to FIG. 10 is independently applied to each interfering transmitter 21a-21d to protect the single receiver 25. This figure shows a preferred embodiment with common, shared antenna signal 30, summing junction 70 and antenna reference signal 71. The function of the Variable Lobe Filter Structure (VLFS) 201a-201d are in-line and must be independent but the function of the Time Delay Tuning Control (TDTC) element 202 and adaptive slope control 225 can be shared through multiplexing techniques implemented in prior art of adaptive arrays where the correlation and integration functions were shared. In other embodiments, the ICS summing junctions are daisy-chained for the use of a standard building block at the cost of additional potential noise insertions and longer convergence times because of signal interaction.

Figure 12:
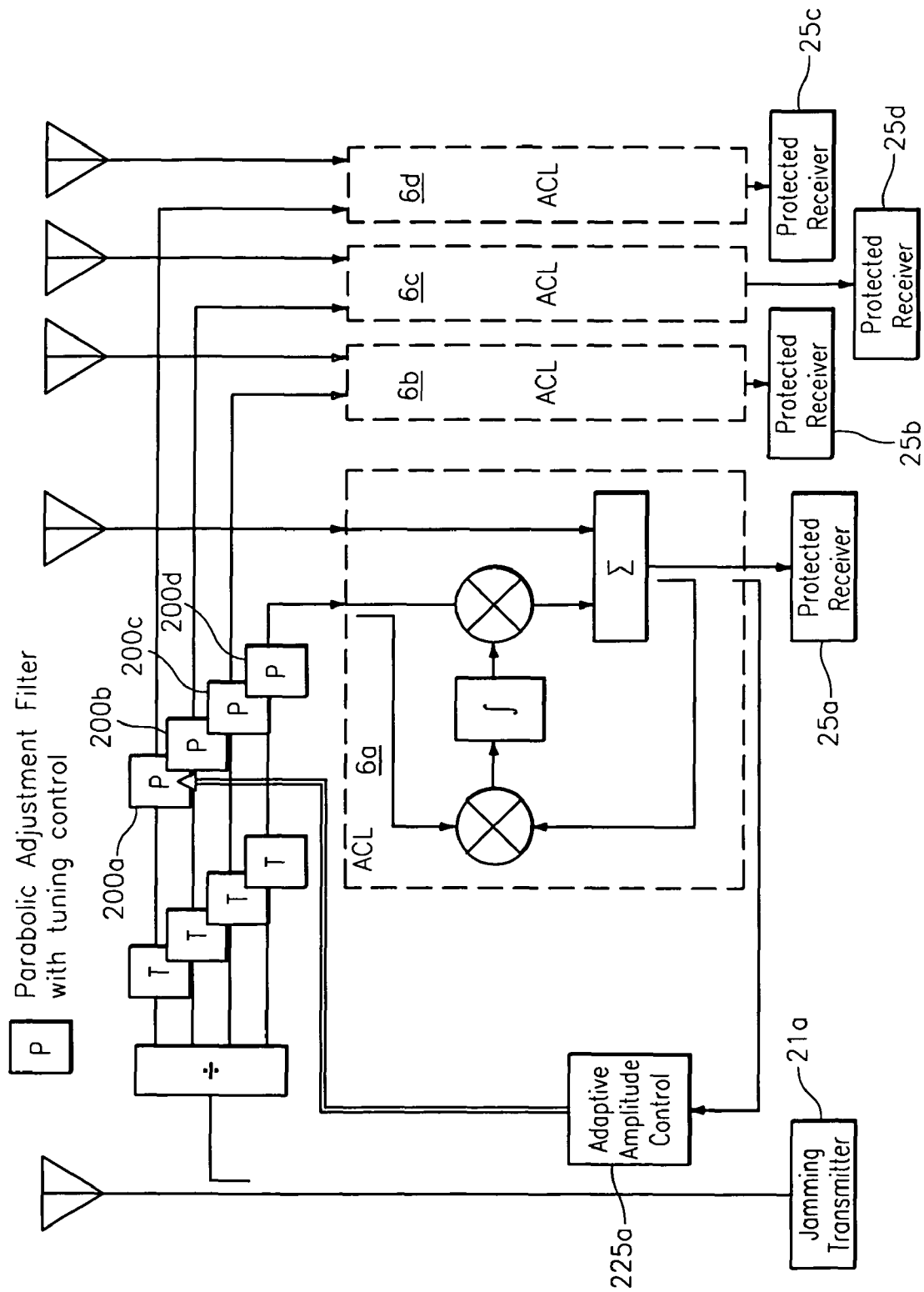
FIG. 12 illustrates an improved cosite interference cancellation system for elimination of interfering signals between a single co-located transceiver and a plurality of receivers to be protected.

Referring now to FIG. 12 there is shown an improved cosite interference cancellation system 20 for elimination of interfering signals between a single co-located transceiver 21 and a plurality of receivers to be protected. In the presently described embodiment, it is desired to protect a multiplicity of receivers, 25a-25d, four of which are shown by way of example and not limitation. To protect the plurality of receivers 25a-25d, each receiver is coupled to a corresponding Interference Cancellation Systems (ICS) 6a-6d operably coupled with associated independent Adaptively tuned quadratic control 200a-200d each comprises three main elements; a Variable Lobe Filter Structure (VLFS) 201, a Time Delay Tuning Control (TDTC) element 202, and a common adaptive amplitude control 225 of prior art.

The foregoing is construed as only being an illustrative embodiment of this invention. Persons skilled in the art can easily conceive of alternative arrangements providing a functionality similar to this embodiment without any deviation from the fundamental principles or the scope of the invention.

What is claimed is:

1. A method for continuously and automatically tuning a quadratic amplitude matching filter (QAMF) to an inserted signal to allow tracking of the inserted signal to match a dynamically changing quadratic amplitude distortion of the inserted signal for improved interference cancellation system performance, the method comprising:
   a) forming an imaginary broadband RF lobed filter having a single quiescent null within a frequency band of interest;
   b) dynamically adjusting a delay time (T) for tuning the single quiescent null of the imaginary broadband RF lobed filter to effectively block the inserted signal to be tracked;
   c) forming a first narrowband RF lobed filter with a quiescent lobe peak centered on a quiescent null of the inserted signal to be tracked, wherein an output of the first narrowband RF lobed filter output has a near-linear and flat amplitude shape to match a dynamically changing quadratic amplitude distortion of the inserted signal to be tracked;
   d) forming a second narrowband RF lobed filter with a quiescent lobe peak centered on the quiescent null of the inserted signal to be tracked, wherein an output of the second narrowband RF lobed filter has a downward quadratic amplitude shape to match a dynamically changing quadratic amplitude distortion of the inserted signal to be tracked;
   e) forming an FIR filter with a quiescent lobe peak centered on the quiescent null of the inserted signal to be tracked, wherein an output of the FIR filter has an upward quadratic amplitude shape to match a dynamically changing quadratic amplitude distortion of the inserted signal to be tracked;
   f) adjusting an in-line path delay of the first narrowband RF lobed filter, the second narrowband RF lobed filter and the FIR filter to have the same throughput delay; and
   g) adjusting combining weights of the respective filter outputs of the first narrowband RF lobed filter, the second narrowband RF lobed filter and the FIR filter to implement a corrective quadratic amplitude shaping of the inserted signal, thereby matching a dynamically changing quadratic amplitude distortion of the inserted signal to be tracked.

2. The method of claim 1, wherein the respective outputs of the first and second narrowband RF lobed filters and the FIR filter are dependent upon the dynamically adjusted delay time (T) for tuning the single quiescent null of the imaginary broadband RF lobed filter.

3. The method of claim 1, wherein the first and second narrowband RF lobed filters and the FIR filter are orthogonal to the imaginary broadband RF lobed filter in a quiescent state.

4. The method of claim 1, wherein said step (g) of adjusting combining weights of respective filter outputs of the first narrowband RF lobed filter, the second narrowband RF lobed filter and the FIR filter parallel filters is performed under control of an external amplitude control signal.

5. The method of claim 1, wherein the first and second narrowband RF lobed filters and the FIR filter are comprised of a plurality of lobes formed within the frequency span of a single lobe of the imaginary broadband RF lobed tuning filter.

6. The method of claim 5, wherein one of the plurality of lobes of the narrowband RF lobed filter is peaked on the inserted signal to be tracked.

7. The method of claim 6, wherein said one of said plurality of lobes peaked on the inserted signal to be tracked is a quiescent lobe of an amplitude sloped matching filter (ASMF) function.

8. The method of claim 6, wherein said one of said plurality of lobes is peaked on the interfering signal to be tracked and is centered at a null of the broadband RF lobed filter.

9. The method of claim 5, wherein one of the plurality of lobes of the imaginary broadband RF lobed tuning filter is centered on the inserted signal to be tracked has an amplitude shape to correct a dynamically changing quadratic amplitude distortion of the inserted signal to be tracked.

10. The method according to claim 1, wherein the broadband RF lobed filter has a null to null bandwidth substantially twice the desired tuning bandwidth.

11. The method according to claim 1, wherein said step (b) of dynamically adjusting a delay time is performed via a control process.

12. The method according to claim 11, wherein the control process comprises:
  a) measuring an RF energy output from the broadband RF filter;
  b) applying a delta increment to the delay time (T);
  c) re-measuring the RF energy output from the broadband RF filter;
  d) comparing the measured and the re-measured values of RF energy; and
  e) determining if the applied delta increment to the delay time (T) improves the tuning as measured by an energy output from the broadband RF filter;
  f) if improved, updating the delay time (T) by adding a positive delta increment as T=T+ΔT;
  g) if unimproved, updating the delta delay time (ΔT) by changing sign of delta delay time increment as ΔT=−ΔT.

13. The method of claim 1, wherein increasing the control voltage causes the delay T to be increased resulting in a narrowing of the filter lobes.

14. The method of claim 13, wherein narrowing the filter lobes results in ;a downward frequency shift of the individual lobes and nulls of the filter.

15. The method of claim 1, wherein decreasing the control voltage causes the delay T to be decreased resulting in a widening of the filter lobes.

16. The method of claim 15, wherein widening the filter lobes results in an upward frequency shift of the individual lobes and nulls of the filter.

* * * * *